United States Patent
Kang et al.

(10) Patent No.: US 12,010,547 B2
(45) Date of Patent: Jun. 11, 2024

(54) METHOD AND DEVICE FOR PERFORMING COMMUNICATION BETWEEN TERMINALS IN WIRELESS COMMUNICATION SYSTEM

(71) Applicant: Samsung Electronics Co., Ltd., Suwon-si (KR)

(72) Inventors: Hyunjeong Kang, Suwon-si (KR); Sangkyu Baek, Suwon-si (KR); Seungri Jin, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 7 days.

(21) Appl. No.: 17/764,752

(22) PCT Filed: Sep. 25, 2020

(86) PCT No.: PCT/KR2020/013121
§ 371 (c)(1),
(2) Date: Mar. 29, 2022

(87) PCT Pub. No.: WO2021/066421
PCT Pub. Date: Apr. 8, 2021

(65) Prior Publication Data
US 2022/0377599 A1  Nov. 24, 2022

(30) Foreign Application Priority Data

Oct. 2, 2019  (KR) .................. 10-2019-0122641
Oct. 17, 2019  (KR) .................. 10-2019-0129343

(51) Int. Cl.
H04W 28/02  (2009.01)
H04W 76/10  (2018.01)
(Continued)

(52) U.S. Cl.
CPC ... *H04W 28/0273* (2013.01); *H04W 28/0263* (2013.01); *H04W 76/10* (2018.02); *H04W 76/30* (2018.02); *H04W 92/18* (2013.01)

(58) Field of Classification Search
CPC .............................. H04W 28/02; H04W 76/10
See application file for complete search history.

(56) References Cited

U.S. PATENT DOCUMENTS 10,462,700 B2  10/2019  Cho et al.
2019/0215725 A1  7/2019  Kim et al.
(Continued)

FOREIGN PATENT DOCUMENTS

EP  3 817 447 A1  5/2021
KR  10-2019-0008983 A  1/2019
WO  2020/222507 A1  11/2020

OTHER PUBLICATIONS

Samsung, SDAP Configuration for NR Sidelink, R2-1911121, 3GPP TSG-RAN WG2 Meeting #107, Prague, Czech, Aug. 26-Aug. 30, 2019.
(Continued)

*Primary Examiner* — Sulaiman Nooristany
(74) *Attorney, Agent, or Firm* — Jefferson IP Law, LLP

(57) ABSTRACT

Provided are a method and apparatus for performing communication between terminals in a wireless communication system, and an operation method of a first terminal in a wireless communication system, includes: determining to establish or release a service data adaptation protocol (SDAP) entity related to sidelink communication, based on SDAP configuration information related to the sidelink communication, wherein the SDAP entity is configured for each of a destination identifier and a cast type; and establishing or releasing the SDAP entity, based on a result of the determining.

7 Claims, 18 Drawing Sheets

(51) Int. Cl.
*H04W 76/30* (2018.01)
*H04W 92/18* (2009.01)

(56) References Cited

U.S. PATENT DOCUMENTS

2019/0297634 A1    9/2019  Dai et al.
2022/0225156 A1*   7/2022  Lee ..................... H04W 28/02

OTHER PUBLICATIONS

European Search Report dated Aug. 16, 2022, issued in European Application No. 20872587.9.
ZTE Corporation et al., Discussion on SDAP issues, R2-1909080, 3GPP TSG RAN WG2 Meeting #107, Prague, Czech, Aug. 16, 2019, see pp. 1-5.
Vivo, PC5 SDAP protocol in NR V2X, 3GPP TSG-RAN WG2 Meeting #10, R2-1910217, Prague, Czech, Aug. 16, 2019, see pp. 1-3.
CATT, Leftover Issues on SDAP, R2-1908746, 3GPP TSG-RAN WG2 Meeting #107, Prague, Czech, Aug. 16, 2019, see pp. 1-9.
Huawei et al., On SDAP entity for NR SL, R2-1911100, 3GPP TSG-RAN WG2 Meeting #107, Prague, Czech, Aug. 16, 2019, see pp. 1-2.
International Search Report and Written Opinion dated Dec. 21, 2020, issued in International Patent Application No. PCT/KR2020/013121.

* cited by examiner

METHOD AND DEVICE FOR PERFORMING COMMUNICATION BETWEEN TERMINALS IN WIRELESS COMMUNICATION SYSTEM

TECHNICAL FIELD

The disclosure generally relates to a wireless communication system, and more particularly, to a method and apparatus for performing communication between terminals in a wireless communication system.

BACKGROUND ART

To meet the increase in demand for wireless data traffic after the commercialization of 4th generation (4G) communication systems, considerable efforts have been made to develop improved 5th generation (5G) communication systems or pre-5G communication systems. This is one reason why '5G communication systems' or 'pre-5G communication systems' are called 'beyond 4G network communication systems' or 'post Long-Term Evolution (LTE) systems.' In order to achieve a high data rate, 5G communication systems are being developed to be implemented in a super-high frequency band (millimeter wave (mmWave)), e.g., a band of 60 GHz. In order to reduce a path loss of radio waves in such a super-high frequency band and to increase a transmission distance of radio waves in 5G communication systems, various technologies have been discussed and are being studied, for example: beamforming, massive multiple-input multiple-output (MIMO), full dimensional MIMO (FD-MIMO), array antennas, analog beam-forming, and large-scale antennas. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In an IoT environment, intelligent internet technology services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of cloud radio access network (RAN) as a big data processing technology described above may be an example of convergence of 5G communication technology and IoT technology.

In the 5G communication system, communication using vehicles, for example, vehicle-to-vehicle, vehicle-to-terminal, or vehicle-to-structure (hereinafter, vehicle-to-everything (V2X)), is being studied, and it is expected that various services may be provided to a user by using the V2X.

As described above, various services may be provided due to the development of wireless communication systems, and thus there is need for methods of seamlessly providing such services.

DESCRIPTION OF EMBODIMENTS

Solution to Problem

Provided are an apparatus and method for performing communication between terminals in a wireless communication system.

Also, provided are an apparatus and method for processing a sidelink service data adaptation protocol (SDAP) layer operation in a wireless communication system.

Also, provided are an apparatus and method for configuring or activating a sidelink SDAP function in a wireless communication system.

In addition, provided are an apparatus and method for supporting in-order delivery of a SDAP packet in a wireless communication system.

Advantageous Effects of Disclosure

According to an embodiment, by supporting a service data adaptation protocol (SDAP) layer function in a sidelink, various services can be effectively supported in a device-to-device (D2D) communication system, considering a quality of service (QoS) level required by a service.

Also, an apparatus and method according to an embodiment of the disclosure can support an in-order packet delivery function without a D2D unicast link configuration in a D2D communication system.

The effects obtainable in the disclosure are not limited to the above-mentioned effects, and other effects not mentioned may be clearly understood by one of ordinary skill in the art from the description below.

BEST MODE

Figure 1:
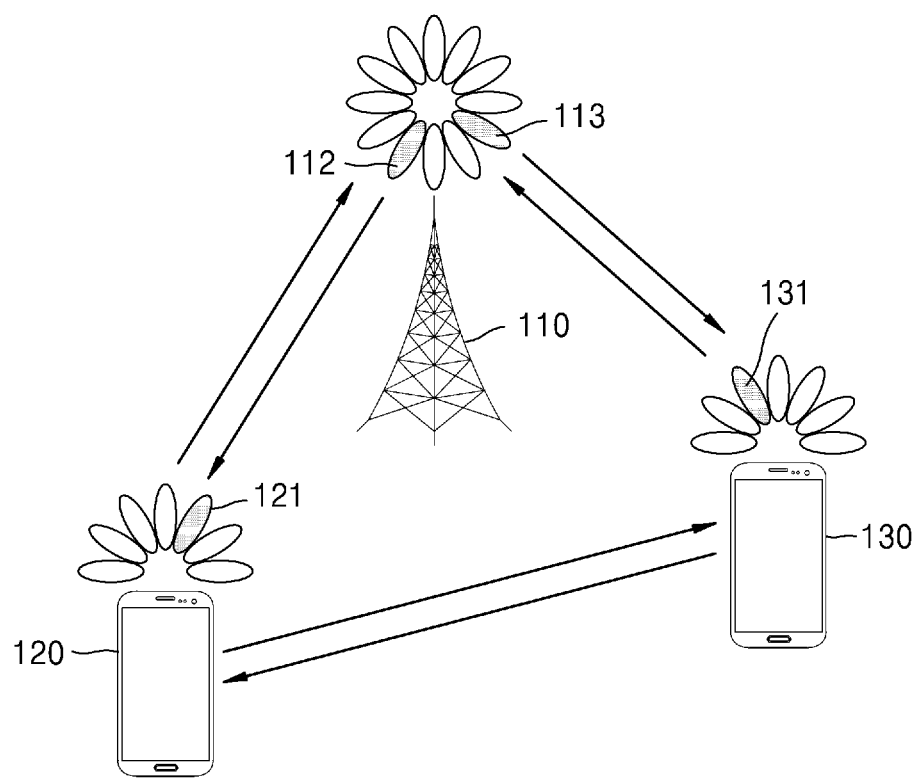
FIG. 1 illustrates a wireless communication system according to an embodiment of the disclosure.

According to an embodiment of the disclosure, an operation method of a terminal in a wireless communication system, includes: determining a type of a core network to which the terminal performing device-to-device (D2D) communication is connected; determining whether to activate a service data adaptation protocol (SDAP) layer function according to the core network; and based on a result of the determining, transmitting a message indicating whether to activate the SDAP layer function to another terminal.

According to an embodiment of the disclosure, an operation method of a first terminal in a wireless communication system, includes: determining to establish or release a service data adaptation protocol (SDAP) entity related to sidelink communication, based on SDAP configuration information related to the sidelink communication, wherein the SDAP entity is configured for each of a destination identifier and a cast type; and establishing or releasing the SDAP entity, based on a result of the determining.

According to an embodiment of the disclosure, an operation method of a second terminal in a wireless communication system, includes: determining to establish or release a service data adaptation protocol (SDAP) entity related to sidelink communication, based on SDAP configuration information related to the sidelink communication, wherein the SDAP entity is configured for each of a destination identifier and a cast type; and establishing or releasing the SDAP entity, based on a result of the determining.

According to an embodiment of the disclosure, a first terminal in a wireless communication system, includes: a transceiver; and at least one processor configured to: determine to establish or release a service data adaptation protocol (SDAP) entity related to sidelink communication, based on SDAP configuration information related to the sidelink communication, wherein the SDAP entity is configured for each of a destination identifier and a cast type; and establish or release the SDAP entity, based on a result of the determining.

According to an embodiment of the disclosure, a second terminal in a wireless communication system, includes: a transceiver; and at least one processor configured to: determine to establish or release a service data adaptation protocol (SDAP) entity related to sidelink communication, based on SDAP configuration information related to the sidelink communication, wherein the SDAP entity is configured for each of a destination identifier and a cast type; and establish or release the SDAP entity, based on a result of the determining.

Mode of Disclosure

Hereinafter, embodiments of the disclosure will be described with reference to accompanying drawings. While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

Advantages and features of the disclosure and methods of accomplishing the same may be understood more readily by reference to the following detailed description of the embodiments and the accompanying drawings. In this regard, the embodiments of the disclosure may have different forms and should not be construed as being limited to the descriptions set forth herein. Rather, these embodiments are provided so that the disclosure will be thorough and complete and will fully convey the concept of the disclosure to one of ordinary skill in the art, and the disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-executable or computer-readable memory capable of directing a computer or another programmable data processing apparatus to implement a function in a particular manner, and thus the instructions stored in the computer-executable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor.

While describing the disclosure, detailed description of related well-known functions or configurations may be omitted when it is deemed that they may unnecessarily obscure the essence of the disclosure. Hereinafter, embodiments of the disclosure will be described with reference to accompanying drawings.

Also, terms for identifying access nodes, terms denoting network entities, terms denoting messages, terms denoting interfaces between network entities, terms denoting various types of identification information, etc. used herein are exemplified for convenience of description. Thus, the terms used in the disclosure are not limited and other terms denoting targets having the same technical meanings may be used.

Terms used in the disclosure are used only to describe a specific embodiment, and may not be intended to limit the scope of other embodiments. An expression used in the singular may encompass the expression in the plural, unless it has a clearly different meaning in the context. Terms used herein, including technical or scientific terms, may have the same meaning as commonly understood by one of ordinary skill in the art described in the disclosure. Among terms used in the disclosure, terms defined in a general dictionary may be interpreted as having the same or similar meanings as those in the context of the related technology, and unless explicitly defined in the disclosure, the terms are not interpreted in ideal or excessively formal meanings. In some cases, even terms defined in the disclosure cannot be interpreted to exclude embodiments of the disclosure.

In various embodiments of the disclosure described below, a hardware approach is described as an example. However, because various embodiments of the disclosure include technology using both hardware and software, various embodiments of the disclosure do not exclude a software-based approach.

In the disclosure, examples of a terminal may include user equipment (UE), a mobile station (MS), a cellular phone, a smartphone, a computer, and a multimedia system capable of performing a communication function.

In the disclosure, a controller may also be referred to as a processor.

In the disclosure, a layer (or a layer apparatus) may also be referred to as an entity.

In the disclosure hereinafter, an apparatus and method for processing a service data adaptation protocol (SDAP) layer operation in a wireless communication system are described. In detail, the disclosure relates to a method of configuring or activating a sidelink SDAP function in sidelink communication between terminals, and a method and apparatus for supporting in-order delivery of an SDAP layer.

In the description below, the term indicating a signal, the term indicating a channel, the term indicating control information, the term indicating a network entity, the term indicating a component of an apparatus, and the like are exemplified for convenience of description. Thus, the terms used in the disclosure are not limited and other terms having the same technical meanings may be used.

In the description below, a physical channel and a signal may be used interchangeably with data or a control signal. For example, a physical downlink shared channel (PDSCH) is a term referring to a physical channel where data is transmitted, but the PDSCH may also be used to refer to data. In other words, in the disclosure, the expression "a physical channel is transmitted" may be equally interpreted as the expression "data or a signal is transmitted via a physical channel".

In the disclosure hereinafter, higher layer signaling denotes a method of transmitting a signal from a base station to a terminal by using a downlink data channel of a physical layer or from a terminal to a base station by using an uplink data channel of a physical layer. The higher layer signaling may be understood as radio resource control (RRC) signaling or a media access control (MAC) control element (CE).

Also, in the disclosure, the expression "greater than" or "less than" is used to determine whether a specific condition is satisfied or fulfilled, but the expression only an example and another expression "equal to or greater than" or "equal to or less than" is not excluded. A condition described to be "equal to or greater than" may be replaced by "greater than", a condition described to be "equal to or less than" may be replaced by "less than", and a condition described to be "equal to or greater than, and less than" may be replaced by "greater than, and equal to or less than".

Also, various embodiments of the disclosure are described by using the terms used in some communication standards (for example, 3rd generation partnership project (3GPP), but the embodiments are only examples for description. The various embodiments of the disclosure may be easily modified and applied to another communication system.

The disclosure relates to a method and apparatus for supporting an SDAP layer operation in a device-to-device (D2D) wireless communication system. Also, the disclosure relates to a method and apparatus for handling an SDAP layer operation in a 2D2 wireless communication system.

FIG. 1 is a diagram of a wireless communication system according to an embodiment of the disclosure. FIG. 1 illustrates a base station 110, a terminal 120, and a terminal 130, as some of nodes using a wireless channel in a wireless communication system. FIG. 1 illustrates only one base station 110, but the wireless communication system may further include a base station that is the same as or similar to the base station 110.

The base station 110 is a network infrastructure providing a wireless access to the terminals 120 and 130. The base station 110 has a coverage defined by a certain geographic area, based on a distance at which a signal is transmittable. The base station 110 may be referred to as, in addition to a base station, an access point (AP), an evolved node B (eNB), a $5^{th}$ generation (5G) node, a next-generation node B (gNB), a wireless point, a transmission/reception point (TRP), or another term having an equivalent technical meaning.

Each of the terminal 120 and the terminal 130 is an apparatus used by a user and performs communication with the base station 110 via a wireless channel. A link heading from the base station 110 towards the terminal 120 or terminal 130 is referred to as a downlink (DL), and a link heading from the terminal 120 or terminal 130 towards the base station 110 is referred to as an uplink (UL). Also, the terminal 120 and the terminal 130 may perform communication with each other via a wireless channel. Here, a link between the terminal 120 and the terminal 130 is referred to as a sidelink, and the sidelink may be interchangeably used with a PC5 interface. In some cases, at least one of the terminal 120 or the terminal 130 may operate without involvement of the user. In other words, at least one of the terminal 120 or the terminal 130 is an apparatus performing machine type communication (MTC), and may not be carried by the user. The terminal 120 and the terminal 130 may each be referred to as, in addition to a terminal, a user equipment (UE), a mobile station, a subscriber station, a remote terminal, a wireless terminal, a user device, or another term having an equivalent technical meaning.

The base station 110, the terminal 120, and the terminal 130 may transmit and receive a wireless signal in a millimeter wave (mmWave) band (for example, 28 GHz, 30 GHz, 38 GHz, or 60 GHz). Here, for improvement of a channel gain, the base station 110, the terminal 120, and the terminal 130 may perform beamforming. Here, the beamforming may include transmission beamforming and reception beamforming. In other words, the base station 110, the terminal 120, and the terminal 130 may assign directivity to a transmission signal or a reception signal. In this regard, the base station 110 and the terminals 120 and 130 may select serving beams 112, 113, 121, and 131 via a beam search or beam management procedure. After the serving beams 112, 113, 121, and 131 are selected, communication thereafter may be performed on a resource in a quasi-co-located (QCL) relationship with a resource transmitting the serving beams 112, 113, 121, and 131.

It may be evaluated that a first antenna port and a second antenna port are in a QCL relationship when large-scale characteristics of a channel that transmitted a symbol on the first antenna port are able to be inferred from a channel that transmitted a symbol on the second antenna port. For example, the large-scale characteristics may include at least one of delay spread, Doppler spread, Doppler shift, average gain, average delay, or spatial receiver parameter.

The terminal 120 and the terminal 130 shown in FIG. 1 may support vehicle communication. Regarding the vehicle communication, the standardization of a vehicle-to-everything (V2X) technology has been completed in 3GPP Release 14 and Release 15, based on a device-to-device (D2D) communication structure in an LTE system, and currently, efforts are being made to develop the V2X technology based on 5G new radio (NR). In NR V2X, D2D unicast communication, group cast (or multicast) communication, and broadcast communication are to be supported. Also, unlike LTE V2X that aims at transmitting/receiving basic safety information required for driving of a vehicle, NR V2X aims at providing further advanced services, such as platooning, advanced driving, extended sensor, and remote driving.

V2X services may be classified into a basic safety service and an advanced service. The basic safety service may include from a vehicle notification (a cooperative awareness message (CAM) or basic safety message (BSM)) service to detailed services, such as a left turn notification service, a front vehicle collision warning service, an emergency vehicle approach notification service, a forward obstacle warning service, and an intersection signal information service, and V2X information may be transmitted/received by using a broadcast, unicast, or groupcast transmission method. The advanced service has strengthened quality of service (QoS) requirements compared to the basic safety service, and requires a method of transmitting/receiving V2X information by using unicast and groupcast transmission methods in addition to broadcast, such that the V2X information is transmitted/received within a specific vehicle group or the V2X information is transmitted/received between two vehicles. The advanced service may include detailed services, such as a platooning service, an autonomous driving service, a remote driving service, and an extended sensor-based V2X service.

Hereinafter, a sidelink refers to a signal transmission/reception path between terminals, and may be interchangeably used with a PC5 interface. Hereinafter, a base station is an entity performing resource allocation of a terminal, and may be a base station supporting both V2X communication and general cellular communication or a base station supporting only V2X communication. In other words, the base station may denote an NR base station (for example, gNB), an LTE base station (for example, eNB), or a road site unit (RSU). The terminal may include not only a general UE and a mobile station, but also a vehicle supporting vehicle-to-vehicle (V2V) communication, a vehicle or handset (for example, a smartphone) of a pedestrian supporting vehicle-to-pedestrian (V2P) communication, a vehicle supporting vehicle-to-network (V2N) communication, a vehicle supporting vehicle-to-infrastructure (V2I) communication, an RSU on which a terminal function is mounted, an RSU on which a base station function is mounted, and an RSU on which a part of a base station function and a part of a terminal function are mounted. Also, a V2X terminal used in the description below may be referred to as a terminal. In other words, a terminal may be used as a V2X terminal in relation to V2X communication.

A base station and a terminal are connected through a universal mobile communications system (UTMS) air (Uu) interface. A UL may denote a wireless link where a terminal transmits data or a control signal to a base station, and a DL may denote a wireless link where a base station transmits data or a control signal to a terminal.

Figure 2:
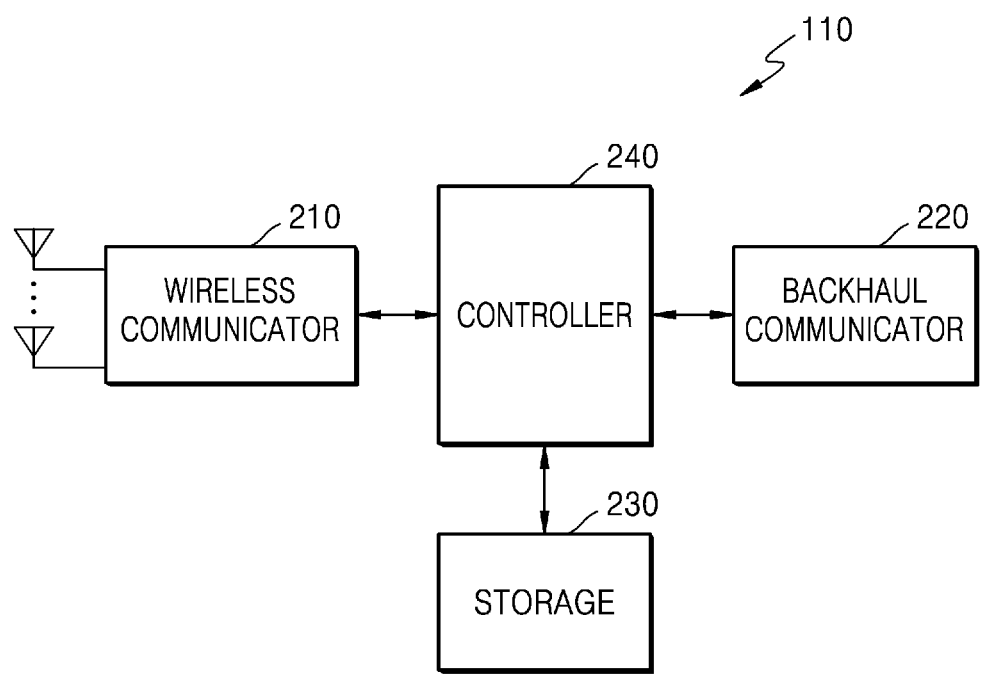
FIG. 2 illustrates a configuration of a base station in a wireless communication system, according to an embodiment of the disclosure.

FIG. 2 is a block diagram of a configuration of a base station in a wireless communication system, according to an embodiment of the disclosure. The configuration shown in FIG. 2 may be understood as a configuration of the base station 110. Terms such as "unit", " . . . or(er)", and the like described below denote a unit that processes at least one function or operation, which may be implemented in hardware or software, or implemented in a combination of hardware and software.

Referring to FIG. 2, the base station 110 includes a wireless communicator 210, a backhaul communicator 220, a storage 230, and a controller 240.

The wireless communicator 210 performs functions for transmitting/receiving a signal via a wireless channel. For example, the wireless communicator 210 may perform conversion between a baseband signal and a bitstring, based on physical layer specifications of a system. For example, during data transmission, the wireless communicator 210 generates complex symbols by encoding and modulating a transmission bitstring. Also, during data reception, the wireless communicator 210 reconstructs a reception bitstring by demodulating and decoding a baseband signal.

Also, the wireless communicator 210 up-converts a baseband signal to a radio frequency (RF) band signal and then transmits the RF band signal via an antenna, and down-converts an RF band signal received via the antenna to a baseband signal. In this regard, the wireless communicator 210 may include a transmit filter, a receive filter, an amplifier, a mixer, an oscillator, a digital-to-analog converter (DAC), and an analog-to-digital converter (ADC). Also, the wireless communicator 210 may include a plurality of transmission/reception paths. In addition, the wireless communicator 210 may include at least one antenna array including a plurality of antenna elements.

In terms of hardware, the wireless communicator 210 may include a digital unit and an analog unit, wherein the analog unit may include a plurality of sub-units according to operation power, an operation frequency, or the like. The digital unit may be implemented as at least one processor (for example, a digital signal processor (DSP)).

The wireless communicator 210 transmits and receives a signal as described above. Accordingly, the wireless communicator 210 may be entirely or partially referred to as a transmitter, a receiver, or a transceiver. In the description below, transmission and reception performed via the wireless channel may be used in the meaning that the process described above is performed by the wireless communicator 210.

The backhaul communicator 220 may provide an interface for communicating with other nodes in a network. In other words, the backhaul communicator 220 may convert a bitstring transmitted from the base station 110 to another node, for example, another access node, another base station, a higher node, or a core network, into a physical signal, and convert a physical signal received from the other node into a bitstring.

The storage 230 may store data for operations of the base station 110, e.g., basic programs, application programs, and configuration information. The storage 230 may be configured in a volatile memory, a nonvolatile memory, or a combination of a volatile memory and a nonvolatile memory. Also, the storage 230 provides stored data upon request by the controller 240.

The controller 240 may control overall operations of the base station 110. For example, the controller 240 may transmit and receive a signal via the wireless communicator 210 or via the backhaul communicator 220. The controller 240 records and read data on and from the storage 230. The controller 240 may perform functions of a protocol stack required in the communication standard. According to another embodiment, the protocol stack may be included in the wireless communicator 210. In this regard, the controller 240 may include at least one processor. According to various embodiments, the controller 240 may control the base station 110 to perform operations according to various embodiments described below.

Figure 3:
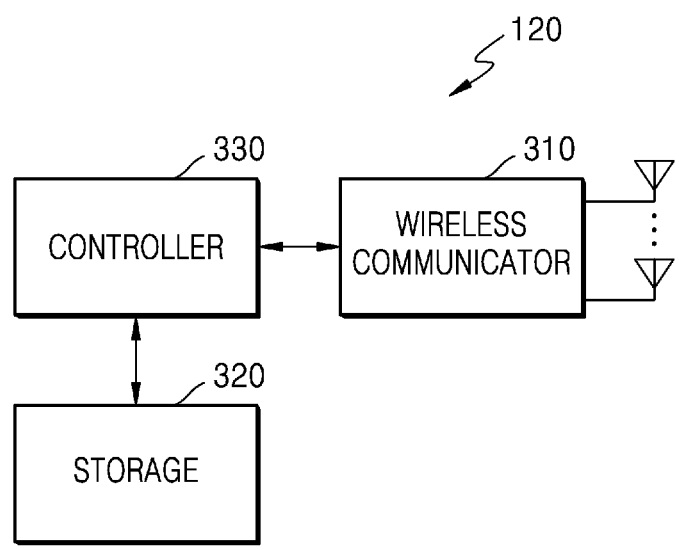
FIG. 3 illustrates a configuration of a terminal in a wireless communication system, according to an embodiment of the disclosure.

FIG. 3 is a block diagram of a configuration of a terminal in a wireless communication system, according to an embodiment of the disclosure. The configuration shown in FIG. 3 may be understood as a configuration of the terminal 120. Terms such as "unit", " . . . or(er)", and the like described below denote a unit that processes at least one function or operation, which may be implemented in hardware or software, or implemented in a combination of hardware and software.

Referring to FIG. 3, the terminal 120 includes a communicator 310, a storage 320, and a controller 330.

The communicator 310 performs functions for transmitting/receiving a signal via a wireless channel. For example, the communicator 310 may perform conversion between a baseband signal and a bitstring, based on physical layer specifications of a system. For example, during data transmission, the communicator 310 generates complex symbols by encoding and modulating a transmission bitstring. Also, during data reception, the communicator 310 reconstructs a reception bitstring by demodulating and decoding a baseband signal. The communicator 310 up-converts a baseband signal to an RF band signal and then transmits the RF band signal via an antenna, and down-converts an RF band signal received via the antenna to a baseband signal. For example, the communicator 310 may include a transmit filter, a receive filter, an amplifier, a mixer, an oscillator, a DAC, and an ADC.

Also, the communicator 310 may include a plurality of transmission/reception paths. In addition, the communicator 310 may include at least one antenna array including a plurality of antenna elements. In terms of hardware, the communicator 310 may include a digital circuit and an analog circuit (for example, a radio frequency integrated circuit (RFIC)). Here, the digital circuit and the analog circuit may be implemented in one package. The communicator 310 may include a plurality of RF chains. In addition, the communicator 310 may perform beamforming.

The communicator 310 transmits and receives a signal as described above. Accordingly, the communicator 310 may be entirely or partially referred to as a transmitter, a receiver, or a transceiver. In the description below, transmission and reception performed via the wireless channel may be used in the meaning that the process described above is performed by the communicator 310.

The storage 320 may store data for operations of the terminal 120, e.g., basic programs, application programs, and configuration information. The storage 320 may be configured in a volatile memory, a nonvolatile memory, or a combination of a volatile memory and a nonvolatile memory. Also, the storage 320 provides stored data upon request by the controller 330.

The controller 330 may control overall operations of the terminal 120. For example, the controller 330 may transmit and receive a signal via the communicator 310. The controller 330 records and read data on and from the storage 320. The controller 330 may perform functions of a protocol stack required in the communication standard. In this regard, the controller 330 may include at least one processor or microprocessor, or may be a part of a processor. A part of the communicator 310 and the controller 330 may be referred to as a communication processor (CP). According to various embodiments, the controller 330 may control the terminal 120 to perform operations according to various embodiments described below.

Figure 4:
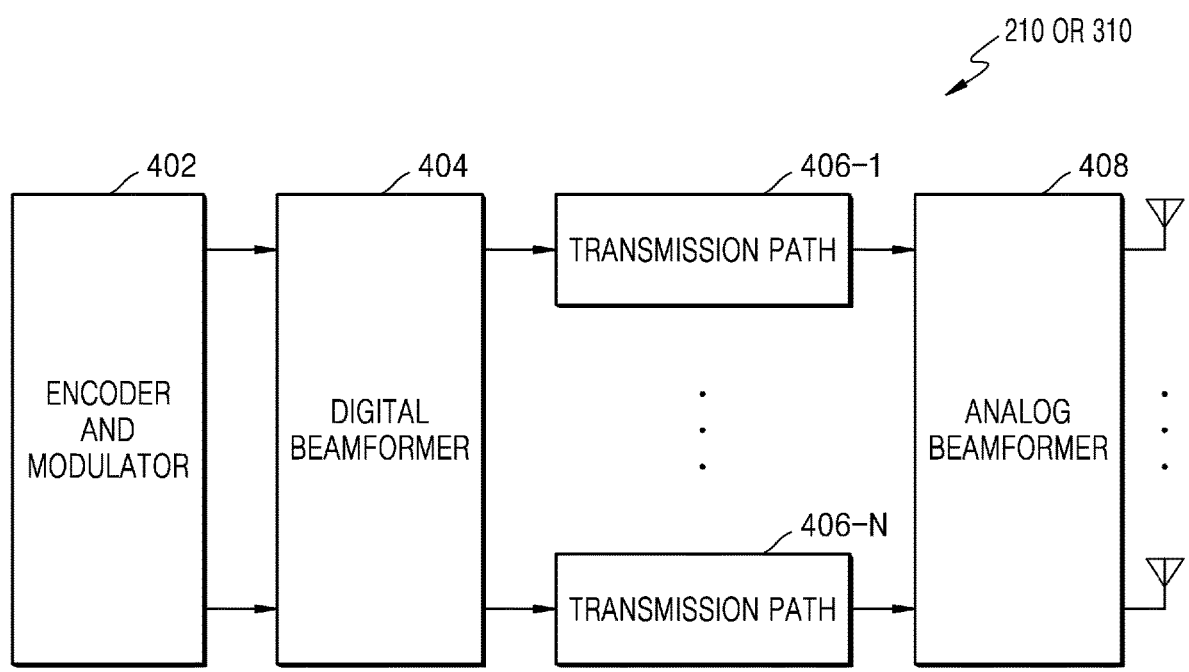
FIG. 4 illustrates a configuration of a communicator in a wireless communication system, according to an embodiment of the disclosure.

FIG. 4 illustrates a configuration of a communicator in a wireless communication system, according to an embodiment of the disclosure. FIG. 4 illustrates an example of a detailed configuration of the wireless communicator 210 of FIG. 2 or the communicator 310 of FIG. 3. In detail, FIG. 4 illustrates components for performing beamforming, as a part of the wireless communicator 210 of FIG. 2 or the communicator 310 of FIG. 3.

Referring to FIG. 4, the wireless communicator 210 or the communicator 310 includes an encoder and modulator 402, a digital beamformer 404, a plurality of transmission paths 406-1 through 406-N, and an analog beamformer 408.

The encoder and modulator 402 performs channel encoding. For the channel encoding, at least one of low-density parity check (LDPC) code, convolutional code, or polar code may be used. The encoder and modulator 402 generates modulation symbols by performing constellation mapping.

The digital beamformer 404 performs beamforming on a digital signal (for example, the modulation symbols). In this regard, the digital beamformer 404 multiplies the modulation symbols by beamforming weights. Here, the beamforming weight is used to change a size and phase of a signal, and may be referred to as a precoding matrix or a precoder. The digital beamformer 404 outputs digitally beamformed modulation symbols to the plurality of transmission paths 406-1 through 406-N. Here, according to a multiple input multiple output (MIMO) transmission technique, the modulation symbols may be multiplexed or same modulation symbols may be provided to the plurality of transmission paths 406-1 through 406-N.

The plurality of transmission paths 406-1 through 406-N convert the digitally beamformed digital signals into analog signals. In this regard, the plurality of transmission paths 406-1 through 406-N may each include an inverse fast Fourier transform (IFFT) operator, a cyclic prefix (CP) inserter, a DAC, and an up-converter. The CP inserter is for orthogonal frequency division multiplexing (OFDM) and may be excluded when another physical layer method (for example, a filter bank multi-carrier (FBMC)) is applied. In other words, the plurality of transmission paths 406-1 through 406-N provide independent signal processes for a plurality of streams generated via the digital beamforming. However, according to an embodiment, some of components of the plurality of transmission paths 406-1 through 406-N may be commonly used.

The analog beamformer 408 performs beamforming on the analog signals. In this regard, the digital beamformer 404 multiples the analog signals by beamforming weights. Here, the beamforming weights are used to change a magnitude and phase of a signal. In detail, the analog beamformer 408 may be variously configured according to a connection structure between the plurality of transmission paths 406-1 through 406-N and antennas. For example, each of the plurality of transmission paths 406-1 through 406-N may be connected to one antenna array. As another example, the plurality of transmission paths 406-1 through 406-N may be connected to one antenna array. As another example, the plurality of transmission paths 406-1 through 406-N may be adaptively connected to one antenna array or connected to two or more antenna arrays.

Figure 5:
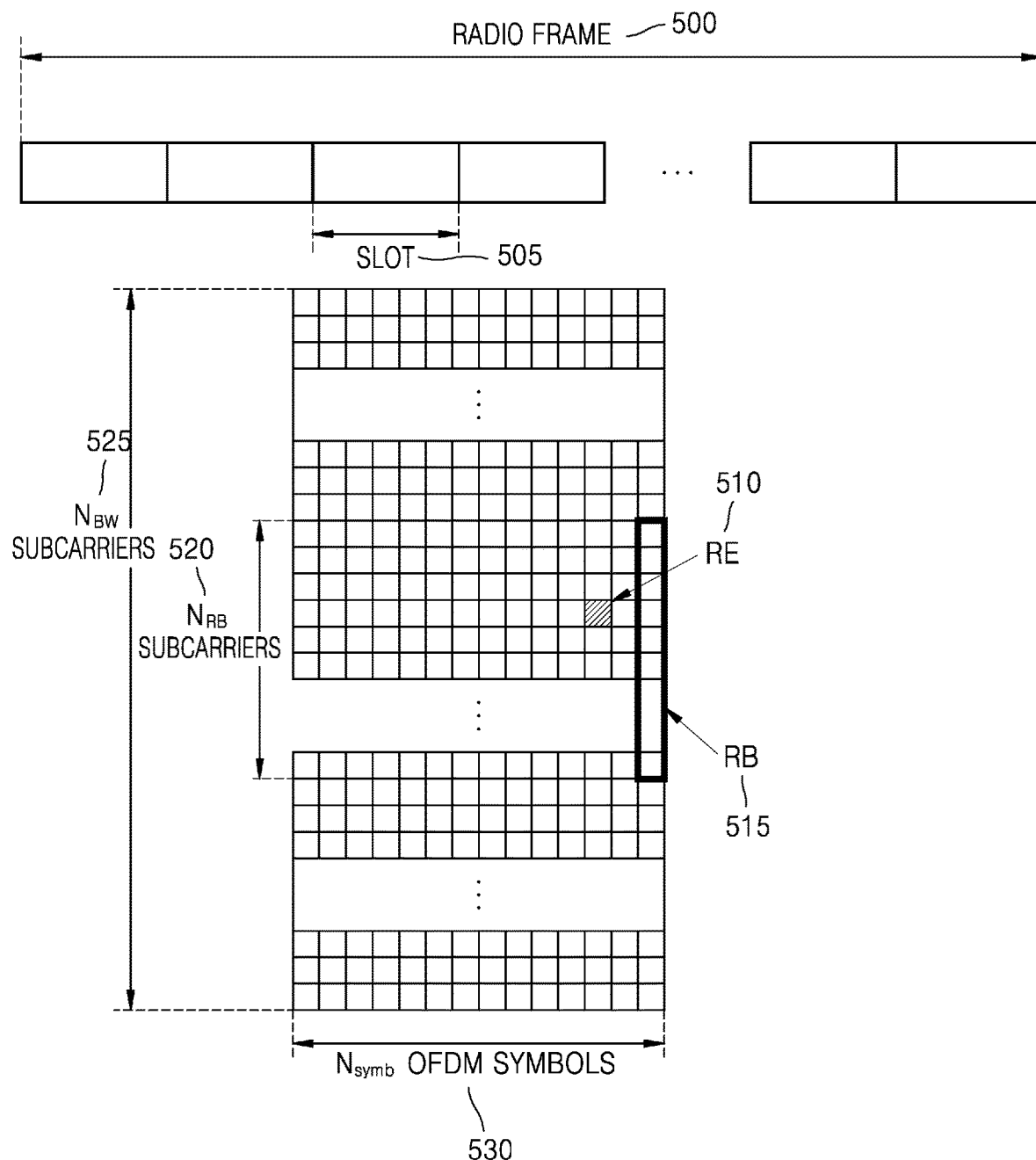
FIG. 5 illustrates a structure of a wireless time-frequency resource in a wireless communication system, according to an embodiment of the disclosure.

FIG. 5 illustrates a structure of a wireless time-frequency resource in a wireless communication system, according to an embodiment of the disclosure.

In FIG. 5, a horizontal axis represents a time domain and a vertical axis represents a frequency domain in a radio resource region. A minimum transmission unit in the time domain is an OFDM symbol or a discrete Fourier transform-spread (DFT-S)-OFDM symbol, and $N_{symb}$ OFDM symbols or DFT-S-OFDM symbols 530 are included in one slot 505. Unlike a slot, a length of a subframe in an NR system may be defined to be 1.0 ms, and a length of a radio frame 500 may be defined to be 10 ms. A minimum transmission unit in the frequency domain is a subcarrier, and a transmission bandwidth of the whole system may include $N_{BW}$ subcarriers 525 in total. Specific numerical values such as $N_{symb}$ and $N_{BW}$ may be variously applied according to a system.

A base unit of a time-frequency resource region is a resource element (RE) 510, and may be indicated by an OFDM symbol index, a DFT-S-OFDM symbol index, or a subcarrier index. A resource block (RB) 515 may be defined by $N_{RB}$ consecutive subcarriers 520 in the frequency domain. Generally, a minimum transmission unit of data is an RB, and in the NR system, $N_{symb}=14$ and $N_{RB}=12$.

The structure of the wireless time-frequency resource of FIG. 5 is applied to a Uu interface. Also, the structure of the wireless time-frequency resource of FIG. 5 may be similarly applied to a sidelink.

FIGS. 6A through 6D illustrate examples of a scenario regarding sidelink communication in a wireless communication system, according to embodiments of the disclosure.

Figure 6A:
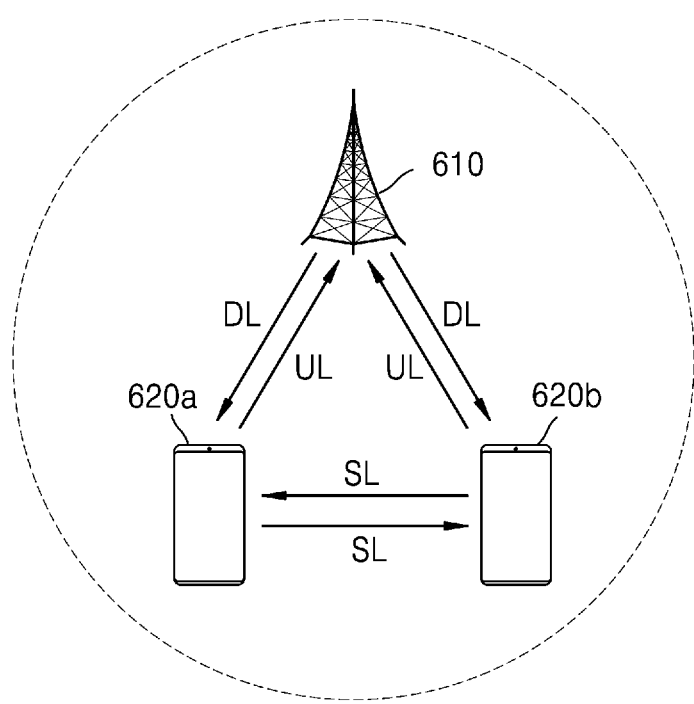
FIG. 6A illustrates an example of an in-coverage scenario in a wireless communication system, according to an embodiment of the disclosure.

FIG. 6A illustrates an in-coverage scenario in which sidelink terminals 620a and 620b are located within coverage of a base station 610. The sidelink terminals 620a and 620b may receive data and control information from the base station 610 via a DL or transmit data and control information to the base station 610 via a UL. Here, the data and control information may be data and control information for sidelink communication, or data and control information for general cellular communication instead of sidelink communication. Also, in FIG. 6A, the sidelink terminals 620a and 620b may transmit/receive data and control information for sidelink communication via a sidelink.

Figure 6B:
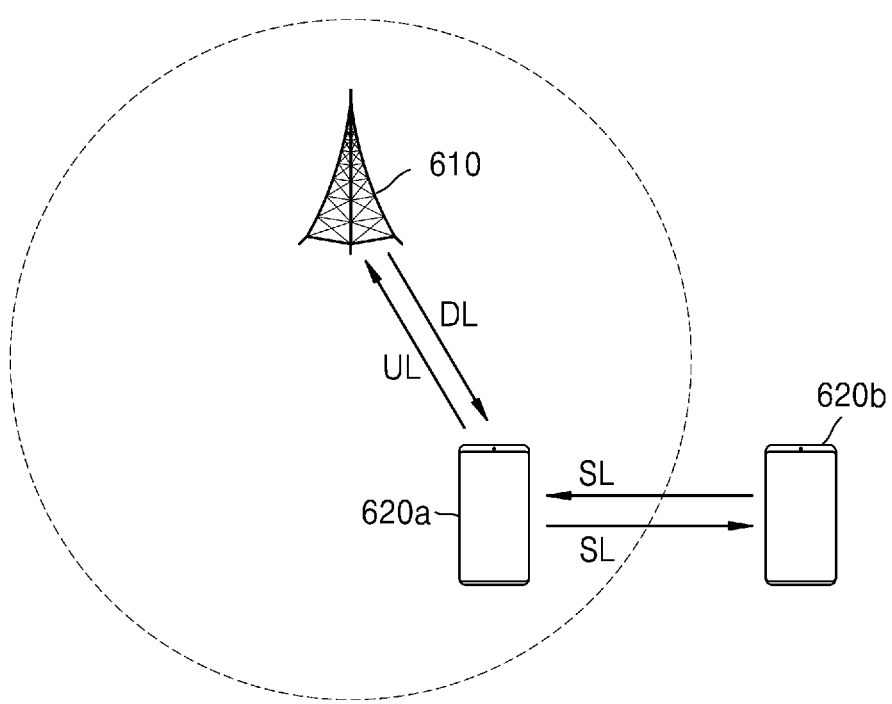
FIG. 6B illustrates an example of a partial coverage scenario in a wireless communication system, according to an embodiment of the disclosure.

FIG. 6B illustrates a case of partial coverage in which, from among sidelink terminals, a first terminal 620a is located within coverage of the base station 610 and a second terminal 620b is located outside the coverage of the base station 610. The first terminal 620a located within the coverage of the base station 610 may receive data and control information from the base station 610 via a DL or transmit data and control information to the base station 610 via a UL. The second terminal 620b located outside the coverage of the base station 610 is unable to receive data and control information from the base station 610 via a DL and unable to transmit data and control information to the base station 610 via a UL. The second terminal 620b may transmit/receive data and control information for sidelink communication to/from the first terminal 620a via a sidelink.

Figure 6C:
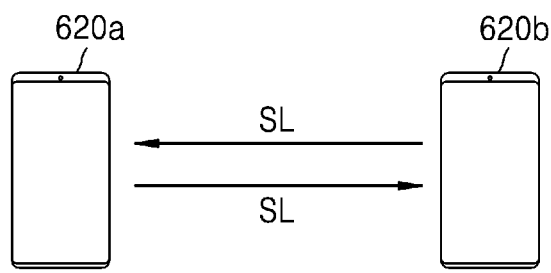
FIG. 6C illustrates an example in which sidelink terminals are located outside a coverage of a base station in a wireless communication system, according to an embodiment of the disclosure.

FIG. 6C illustrates a case in which sidelink terminals (for example, the first terminal 620a and the second terminal 620b) are located outside the coverage of the base station 610. Accordingly, the first terminal 620a and second terminal 620b are unable to receive data and control information from the base station 610 via a DL and unable to transmit data and control information to the base station 610 via a UL. The first terminal 620*a* and second terminal 620*b* may transmit and receive data and control information for sidelink communication via a sidelink.

Figure 6D:
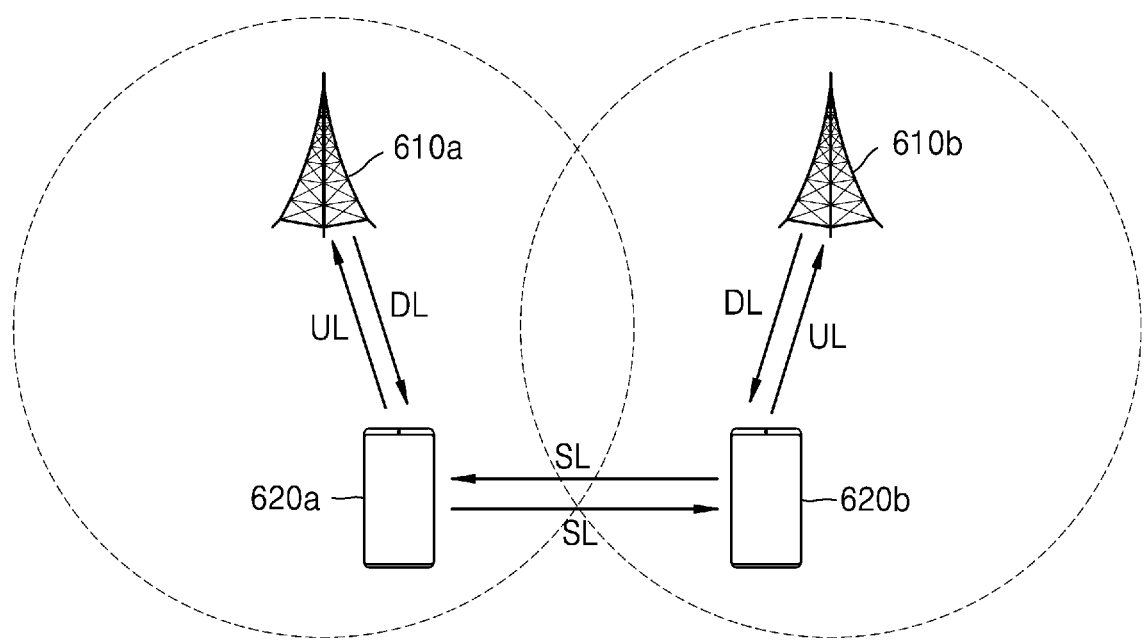
FIG. 6D illustrates an example of a scenario in which inter-cell sidelink communication of terminals is performed in a wireless communication system, according to an embodiment of the disclosure.

FIG. 6D illustrates a case in which inter-cell sidelink communication is performed when the first terminal 620*a* and second terminal 620*b* performing sidelink communication are accessed to different base stations (for example, a first base station 610*a* and a second base station 610*b*) (i.e., RRC-connected state) or camped (for example, RRC-released state, i.e., RRC idle state). Here, the first terminal 620*a* may be a sidelink transmission terminal and the second terminal 620*b* may be a sidelink reception terminal. Alternatively, the first terminal 620*a* may be a sidelink reception terminal and the second terminal 620*b* may be a sidelink transmission terminal. The first terminal 620*a* may receive a sidelink-dedicated system information block (SIB) from the accessed (or camped) first base station 610*a*, and the second terminal 620*b* may receive a sidelink-dedicated SIB from the accessed (or camped) second base station 610*b*. Here, information of the sidelink-dedicated SIB received by the first terminal 620*a* and information of the sidelink-dedicated SIB received by the second terminal 620*b* may be different from each other. Accordingly, it is required to unify the information to perform sidelink communication between terminals located in different cells.

In the examples of FIGS. 6A through 6D, a sidelink system including two terminals (for example, the first terminal 620*a* and the second terminal 620*b*) are described for convenience of description, but the disclosure is not limited thereto and may be applied to a sidelink system participated by three or more terminals. Also, a UL and DL between the base station 610 and sidelink terminals may be referred to as a Uu interface, and a sidelink between the sidelink terminals may be referred to as a PC5 interface. In the following description, a UL or DL and a Uu interface may be interchangeably used, and a sidelink and a PC5 may be interchangeably used.

Meanwhile, in the disclosure, a terminal may denote a vehicle supporting V2V communication, a vehicle or handset (or smartphone) of a pedestrian supporting V2P communication, a vehicle supporting V2N communication, or a vehicle supporting V2I communication. Also, in the disclosure, a terminal may denote an RSU with a terminal function, an RSU with a base station function, or an RSU with a part of a base station function and a part of a terminal function.

Figure 7A:
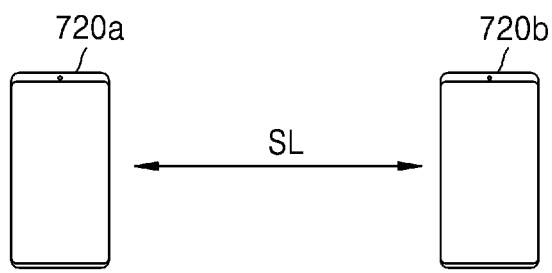
FIG. 7A illustrates an example of a transmission method of sidelink communication using unicast, in a wireless communication system, according to an embodiment of the disclosure.
Figure 7B:
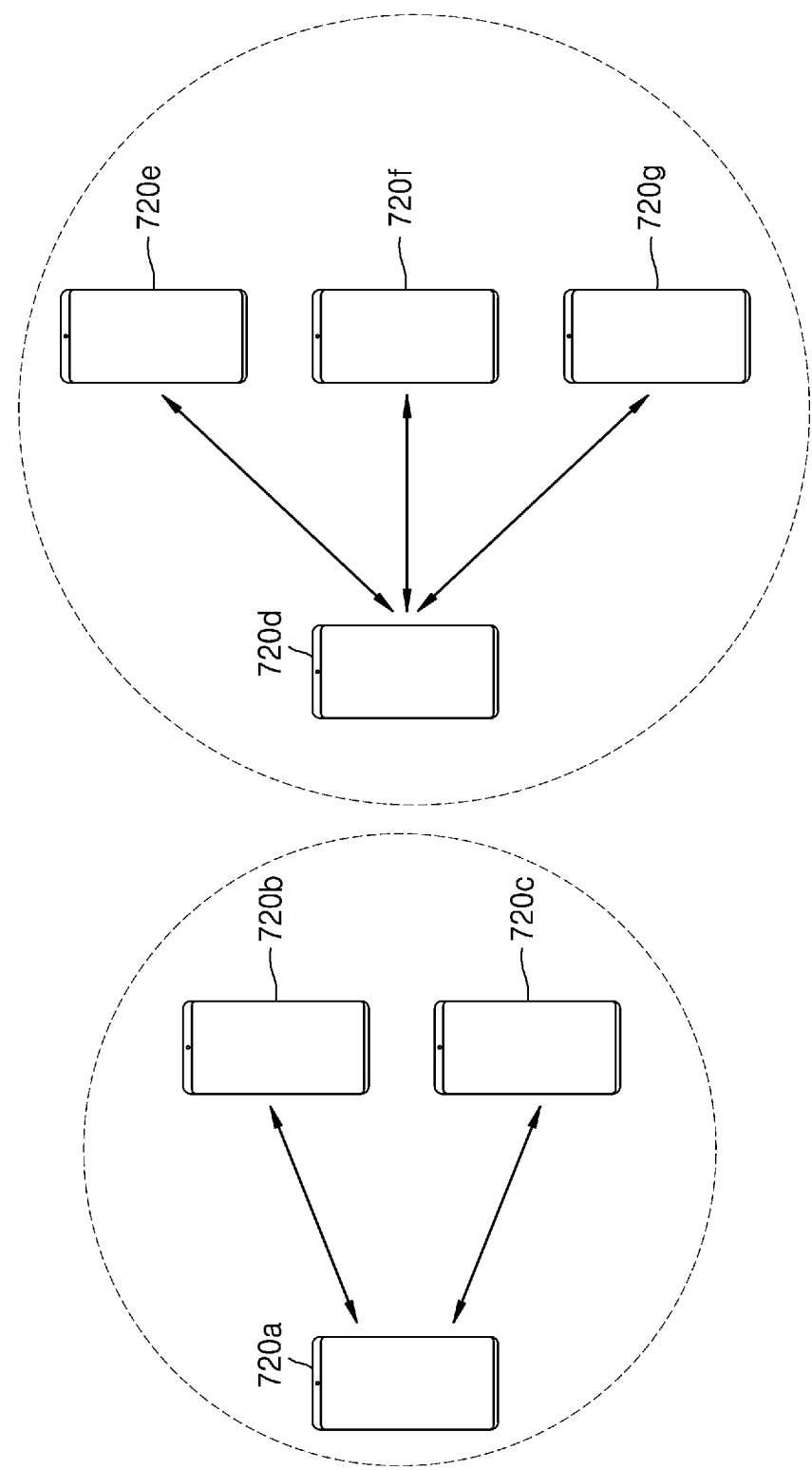
FIG. 7B illustrates an example of a transmission method of sidelink communication using groupcast, in a wireless communication system, according to an embodiment of the disclosure.

FIGS. 7A and 7B illustrate examples of a transmission method of sidelink communication in a wireless communication system, according to various embodiments of the disclosure. FIG. 7A illustrates a unicast method and FIG. 7B illustrates a groupcast method.

As shown in FIG. 7A, a transmission terminal 720*a* and a reception terminal 720*b* may perform communication in a one-on-one manner. A transmission method shown in FIG. 7A may be referred to as unicast communication. As shown in FIG. 7B, transmission terminal 720*a* or 720*d* and reception terminals 720*b* 720*c*, 720*e*, 720*f*, and 720*g* may perform communication in a one-to-many manner. A transmission method shown in FIG. 7B may be referred to as a groupcast or multicast communication. In FIG. 7B, a first terminal 720*a*, a second terminal 720*b*, and a third terminal 720*c* may form one group, and terminals (the first through third terminals 720*a* through 720*c*) in the group may perform groupcast communication. A fourth terminal 720*d*, a fifth terminal 720*e*, a sixth terminal 720*f*, and a seventh terminal 720*g* may form another group, and terminals (the fourth through seventh terminals 720*d* through 720*g*) in the group may perform groupcast communication. A terminal may perform groupcast communication within a group to which it belongs, or may perform unicast, groupcast, or broadcast communication with at least one other terminal in different groups. In FIG. 7B, two groups are illustrated, but the disclosure is not limited thereto and may be applied even when a greater number of groups are formed.

Meanwhile, although not shown in FIG. 7A or 7B, sidelink terminals may perform broadcast communication. The broadcast communication indicates a method in which data and control information transmitted by a sidelink transmission terminal via a sidelink are received by all sidelink terminals. For example, in FIG. 7B, when the first terminal 720*a* is a transmission terminal, remaining terminals 720*b* through 720*g* may receive data and control information transmitted by the first terminal 720*a*.

The sidelink unicast communication, groupcast communication, and broadcast communication described above may be supported in an in-coverage scenario, a partial-coverage scenario, or out-of-coverage scenario.

Unlike an LTE sidelink, an NR sidelink may consider support for a transmission type in which a vehicle terminal transmits data only to a specific terminal via unicast, and a transmission type in which a vehicle terminal transmits data to a plurality of specific terminals via groupcast. For example, when a service scenario such as platooning that is a technology of grouping and moving two or more vehicles in a form of a platoon by connecting the two or more vehicles via one network is considered, such unicast and group cast technologies may be useful. In particular, unicast communication may be used for a leader terminal of a group connected via platooning to control one specific terminal, and groupcast communication may be used for the leader terminal to simultaneously control a group including a plurality of specific terminals.

A base station or a terminal may perform resource allocation for sidelink communication (i.e., V2X). The resource allocation for sidelink transmission may be performed with a resource pool defined in time and frequency domains. The resource pool may be configured within a bandwidth part (BWP) in the frequency domain. In detail, following methods may be used for the resource allocation.

(1) Mode 1 Resource Allocation—Scheduled Resource Allocation

The scheduled resource allocation is a method by which a base station allocates a resource used for sidelink transmission via a scheduling method dedicated to RRC-connected terminals. The base station may allocate a resource to a terminal within coverage. The base station may transmit resource allocation information to a transmission terminal for sidelink transmission. In other words, the base station may schedule a resource for sidelink transmission and transmit a scheduling result to the terminal. The scheduled resource allocation method may be effective in interference management and management of a resource pool (dynamic allocation and/or semi-persistence transmission) because the base station is able to manage resources for a sidelink. When there is data to be transmitted to other terminal(s), an RRC connected mode terminal may transmit information notifying the base station that there is the data to be transmitted to the other terminal(s) by using an RRC message or a media access control (MAC) control element (CE). For example, the RRC message transmitted by the terminal to the base station may be a sidelink terminal information (SidelinkUE-Information) or terminal assistance information (UEAssistanceInformation) message, and the MAC CE may be buffer status report (BSR) MAC CE or scheduling request (SR) including at least one of an indicator indicating BSR for V2X communication or information about a size of data buffered for sidelink communication.

(2) Mode 2 Resource Allocation—Terminal (UE) Autonomous Resource Selection

Secondly, the UE autonomous resource selection is a method of providing, to a terminal, a sidelink transmission/reception resource pool for V2X via system information, an RRC message (for example, an RRC reconfiguration message or PC5-RRC message), or pre-configuration information, and selecting, by the terminal, a resource pool and a resource according to a determined rule. The UE autonomous resource selection may correspond to one or a plurality of following resource allocation methods.

- A UE autonomously selects a sidelink resource for transmission.
- A UE assists sidelink resource selection for other UEs.
- A UE is configured with NR configured grant for sidelink transmission.
- A UE schedules sidelink transmission of other UEs.
- A UE autonomous resource selection method may include zone mapping, sensing-based resource selection, and random selection.
- In addition, even when present in coverage of a base station, resource allocation or resource selection may be unable to be performed in scheduled resource allocation or a UE autonomous resource selection mode. In this case, the terminal may perform V2X sidelink communication via a preconfigured sidelink transmission/reception resource pool (reconfiguration resource pool) or a sidelink transmission/reception resource pool configured for an exceptional situation (exceptional resource pool).
- Also, when terminals for V2X communication are present outside the coverage of the base station, the terminal may perform V2X sidelink communication via a preconfigured sidelink transmission/reception resource pool.
- A sidelink radio bearer (SLRB) configuration and an SLRB for transmitting a sidelink flow or a packet are mapped to a sidelink (SL) logical channel (LC), and the SL LC may be mapped to an SL LC group (LCG). The SLRB configuration and the SLRB may be distinguished by a combination of a source index, a destination index, a cast type, a QoS flow identifier (QFI)/ProSe flow identifier or PC5 flow identifier (PFI), and priority.

According to an embodiment of the disclosure, an SDAP layer function for PC5 communication may be used when it is determined that a terminal is accessed to a 5G core network (5GC). According to an embodiment, a base station (gNB or ng-eNB) belonging to the 5GC may configure a PC5 SDAP function via an RRC dedicated or V2X SIB message. For example, an RRCReconfiguration message may include NR sidelink (SL) configuration information including a PC5 SDAP function configuration. Also, RRC-ConnectionReconfiguration message may include the NR SL configuration information including the PC5 SDAP function configuration. For example, SIBxx transmitted from the ng-eNB may include the NR SL configuration information including the PC5 SDAP function configuration. For example, SIByy transmitted from the gNB may include the NR SL configuration information including the PC5 SDAP function configuration. According to an embodiment, PC5 SDAP function configuration information may be exchanged between the gNB and the ng-eNB via signaling, and the NR SL configuration information may be transmitted from the gNB to the ng-eNB. An NR SL configuration request may be transmitted from the ng-eNB to the gNB when the ng-eNB receives SidelinkUEInformation or UEAssistanceInformation with NR SL information by the terminal (UE).

According to another embodiment, the SDAP layer function for PC5 communication may be used when it is determined that the terminal is accessed to an evolved packet core network (EPC). A base station (eNB or en-gNB) belonging to the EPC supporting 5G (or new radio) PC5 may configure the PC5 SDAP function via the RRC dedicated or V2X SIB message. For example, the RRCReconfiguration message may include the NR SL configuration information including the PC5 SDAP function configuration. Also, the RRCConnectionReconfiguration message may include the NR SL configuration information including the PC5 SDAP function configuration. For example, SIBxx transmitted from the eNB may include the NR SL configuration information including the PC5 SDAP function configuration. For example, SIByy transmitted from the en-gNB may include the NR SL configuration information including the PC5 SDAP function configuration. For example, the PC5 SDAP function configuration information may be exchanged between the eNB and the en-gNB via signaling, and the NR SL configuration information may be transmitted from the en-gNB to the eNB. The NR SL configuration request may be transmitted from the eNB to the en-gNB when the eNB receives the SidelinkUEInformation or the UEAssistanceInformation with the NR SL information by the terminal (UE).

According to another embodiment, when the terminal is outside a range of the base station supporting the PC5 communication (including a case where the terminal is located in a range of a base station not supporting the PC5 communication), i.e., in a case of an out-of-coverage terminal, the PC5 SDAP function configuration information may be pre-configured in the terminal.

According to an embodiment of the disclosure, a terminal authenticated regarding NR SL-based PC5 communication may support an SDAP function. SDAP function activation of the authenticated terminal may be determined according to a type of a core network to which the terminal is accessed, a core network to which an opponent terminal performing direct communication with the terminal, or a core network to which a transmission terminal transmitting data to the terminal in a PC5 manner. When the terminal is connected to a 5GC, it may be determined that the SDAP function is activated. When the terminal is connected to an EPC, it may be determined that the SDAP function is deactivated. According to an embodiment, whether to activate or deactivate the SDAP function may be determined according to a type of the core network to which the transmission terminal is connected. When the transmission terminal is connected to the 5GC, it may be determined that the SDAP function is activated. When the transmission terminal is connected to the EPC, it may be determined that the SDAP function is deactivated. According to another embodiment, whether to activate or deactivate the SDAP function may be determined according to a type of a core network to which an initiating UE of a PC5 unicast link is connected. When the initiating UE is connected to the 5GC, it may be determined that the SDAP function is activated. When the initiating UE is connected to the EPC, it may be determined that the SDAP function is deactivated. For example, the initiating UE may correspond to a terminal that initiated a PC5 unicast link configuration when the PC5 unicast link is configured in a bi-directional type. According to another embodiment, when at least one of two terminals is connected to the 5GC in case of the PC5 unicast link, it may be determined that the SDAP function is activated. According to another embodiment, when at least one of two terminals is connected to the EPC in case of the PC5 unicast link, it may be determined that the SDAP function is deactivated.

Figure 8A:
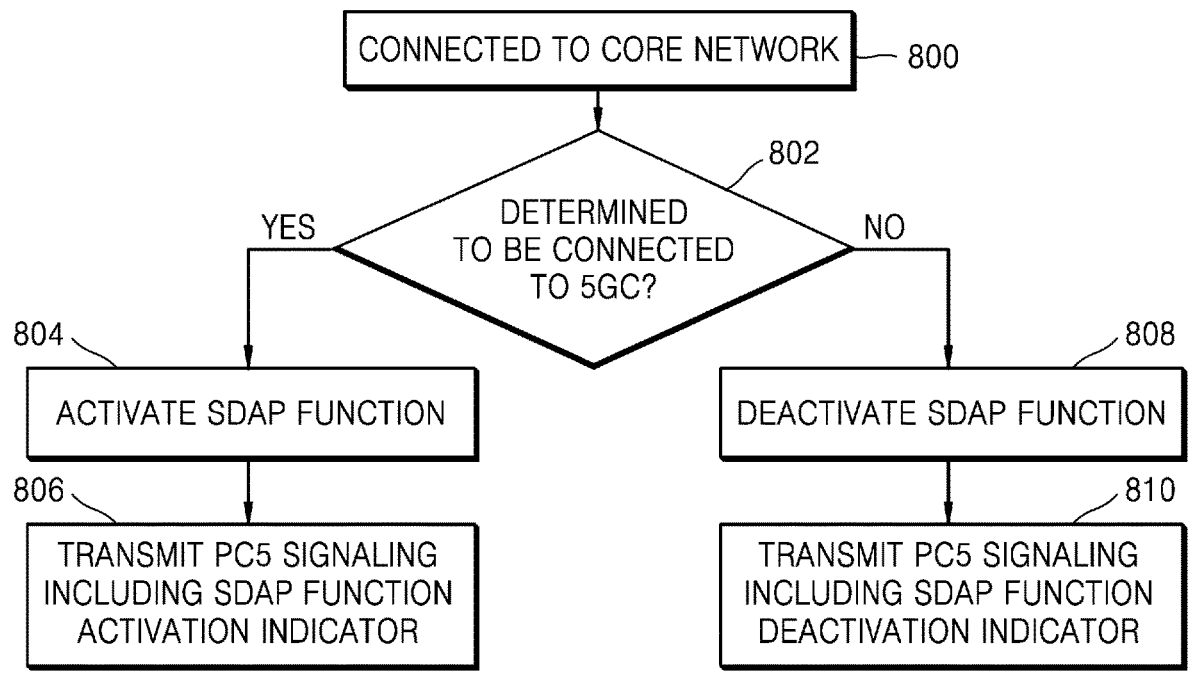
FIG. 8A illustrates operations of a terminal determining activation or deactivation of a service data adaptation protocol (SDAP) function and transmitting signaling regarding the determination, according to an embodiment of the disclosure.
Figure 8B:
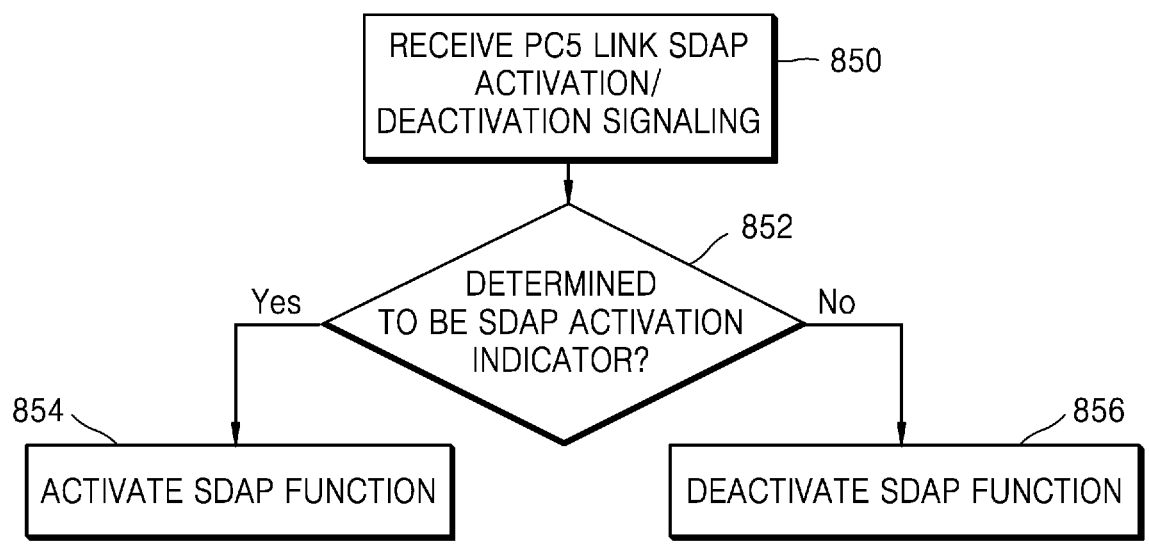
FIG. 8B illustrates operations of a terminal receiving signaling indicating activation or deactivation of an SDAP function, according to an embodiment of the disclosure.

FIGS. 8A and 8B illustrate operations of a terminal determining activation or deactivation of an SDAP function for PC5 communication, according to various embodiments of the disclosure. FIG. 8A illustrates operations of a terminal determining whether to activate or deactivate an SDAP function, and transmitting signaling regarding a result of the determination, and FIG. 8B illustrates operations of a terminal receiving signaling indicating activation or deactivation of an SDAP function.

Referring to FIG. 8A, in operation 800, the terminal may determine being connected to a core network. Then, in operation 802, the terminal may determine a type of the core network. According to the determination of operation 802, when it is determined that the terminal is connected to a 5GC, the terminal may activate a PC5 SDAP function in operation 804. In operation 806, the terminal may transmit PC5 signaling including an SDAP function activation indicator. The PC5 signaling transmitted by the terminal in operation 806 may include at least one of PC5 RRC, sidelink control information (SCI), an MAC (sub-)header, a radio link control (RLC) header, a packet data convergence protocol (PDCP) header, an MAC control element (CE) header, an RLC control protocol data unit (PDU), or a PDCP control PDU.

According to an embodiment, when the terminal determines to be not connected to the 5GC according to the determination of operation 802, the terminal may deactivate the PC5 SDAP function in operation 808. The terminal may determine that it is not required to establish its SDAP entity, and transmit PC5 signaling including an SDAP function deactivation indicator in operation 810. The PC5 signaling transmitted by the terminal in operation 810 may include at least one of PC5 RRC, SCI, an MAC (sub-)header, an RLC header, a PDCP header, an MAC CE, an RLC control PDU, or a PDCP control PDU. According to another embodiment, the terminal may indicate PC5 SDAP function deactivation by not transmitting the PC5 SDAP function activation indicator.

Meanwhile, in a PC5 unicast link, signaling indicating SDAP function activation or deactivation may be transmitted via PC5 RRC between two terminals. In the PC5 unicast link, a PC5 broadcast link, or a PC5 groupcast link, the signaling indicating the SDAP function activation or deactivation may be transmitted via PC5 signaling transmitted by a TX UE. According to an embodiment, the PC5 signaling used to indicate the SDAP function activation or deactivation may include at least one of SCI, an MAC header, an MAC sub-header, an RLC header, a PDCP header, an MAC CE, an RLC control PDU, or a PDCP control PDU.

Referring to FIG. 8B, the terminal may receive, in operation 850, at least one of signaling indicating SDAP activation of a PC5 link or signaling indicating SDAP deactivation. In operation 852, the terminal may determine whether the signaling indicates SDAP activation. According to the determination of operation 852, the terminal may activate an SDAP function in operation 854. According to the determination of operation 852, the terminal may deactivate an SDAP function in operation 856. According to an embodiment, the terminal may determine not to establish its SDAP entity. Signal information used by the terminal to determine SDAP activation in operation 852 may include at least one of PC5 RRC, SCI, an MAC header, an MAC sub-header, an RLC header, a PDCP header, an MAC CE, an RLC control PDU, or a PDCP control PDU. According to another embodiment, the terminal may determine PC5 SDAP function deactivation when the PC5 SDAP function activation indicator is not received. The terminal performing the operations of FIG. 8B may correspond to an in-coverage terminal or an out-of-coverage terminal.

When the PC5 SDAP function is activated according to procedures of FIGS. 8A and 8B described above, the terminal may establish an SDAP entity. The terminal may establish a transmitting SDAP entity regarding the SDAP function activated in operation 804. Alternatively, the terminal may establish a receiving SDAP entity regarding the SDAP function activated in operation 854. An SDAP entity for at least one of a transmission terminal or a reception terminal may be established for at least one of pieces of information of Table 1 below.

TABLE 1

(1) Established for DST identifier
(2) Established for DST identifier and corresponding PC5 flow ID
(3) Established for DST identifier and SRC identifier
(4) Established for DST identifier, corresponding PC5 flow ID, and SRC identifier
Cast type may also be configured regarding DST identifier for (1) to (4)
(5) Established for PC5 flow ID (Flow ID is information generated by TX UE, and thus (5) is applicable when RX UE is aware of flow ID information generated by TX UE)
(6) Established for UE pair (it is difficult to distinguish UE pair in access stratum)
(7) Established for each PC5 unicast link (PC5 unicast link is applicable only to PC5 unicast and is difficult to be applied to groupcast/broadcast)

According to an embodiment, the transmission terminal and the reception terminal may determine to establish an SDAP entity according to an indication of PC5-RRC, regarding a PC5 unicast link. The transmission terminal and the reception terminal may determine to release an SDAP entity according to the indication of PC5-RRC, regarding the PC5 unicast link.

According to an embodiment, the transmission terminal may determine to establish an SDAP entity according to an indication of PC5-RRC, regarding a PC5 groupcast link. The transmission terminal may determine to release an SDAP entity according to the indication of PC5-RRC, regarding the PC5 groupcast link. According to an embodiment, upon receiving a packet corresponding to a receiving SDAP entity that has not yet established, the reception terminal may determine to establish the receiving SDAP entity, regarding the PC5 groupcast link. When it is determined that the packet corresponding to the receiving SDAP entity is no longer received (for example, according to timer expiration or indication of an upper layer), the reception terminal may determine to release the receiving SDAP entity, regarding the PC5 groupcast link.

According to an embodiment, the transmission terminal may determine to establish an SDAP entity according to an indication of PC5-RRC, regarding a PC5 broadcast link. According to an embodiment, the transmission terminal may determine to release an SDAP entity according to an indication of PC5-RRC, regarding the PC5 broadcast link. According to an embodiment, upon receiving a packet corresponding to a receiving SDAP entity that has not yet established, the reception terminal may determine to establish the receiving SDAP entity, regarding the PC5 broadcast link. According to an embodiment, when it is determined that the packet corresponding to the receiving SDAP entity is no longer received (for example, according to timer expiration or indication of an upper layer), the reception terminal may determine to release the receiving SDAP entity, regarding the PC5 broadcast link.

According to an embodiment, when it is determined that an SLRB is released, an SDAP entity of a terminal may delete QoS flow to SLRB configuration information corresponding to the SLRB.

Operations by which a reception terminal establishes a PC5 SDAP entity, according to an embodiment of the disclosure, will be described in FIG. 9. The operations shown in FIG. 9 may be performed by a terminal in which an SDAP function is activated according to the procedures shown in FIGS. 8A and 8B.

Figure 9:
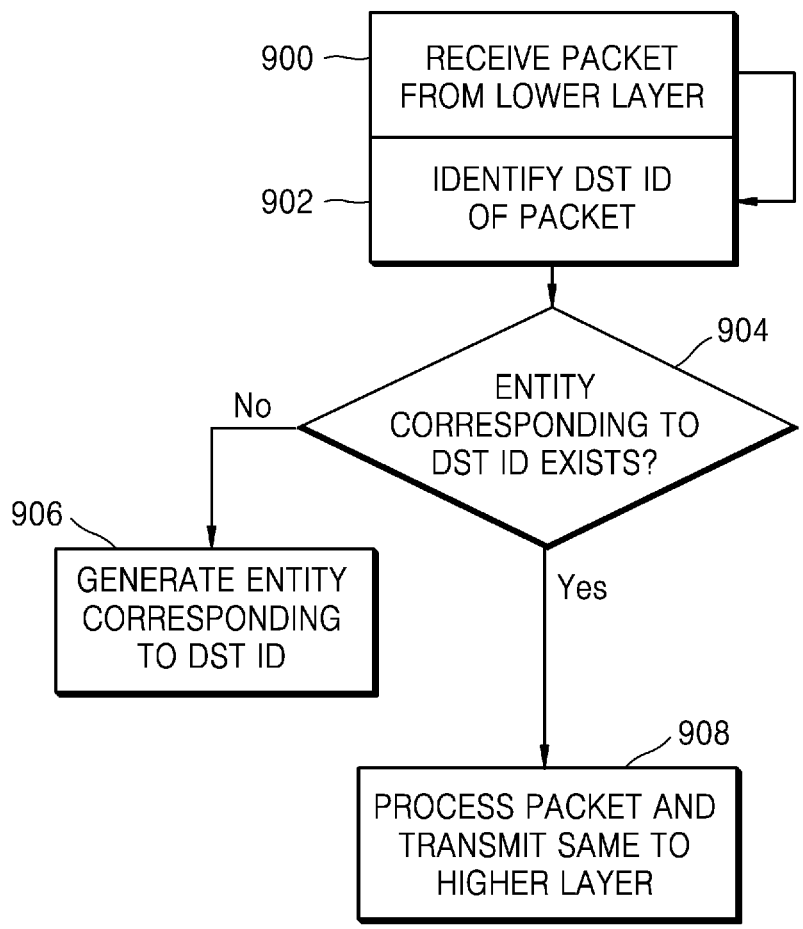
FIG. 9 illustrates operations by which a reception terminal establishes a PC5 SDAP entity, according to an embodiment of the disclosure.

FIG. 9 illustrates the operations by which the reception terminal establishes the PC5 SDAP entity, according to an embodiment of the disclosure. FIG. 9 describes an example according to a case in which an SDAP entity is established for a destination (DST) identifier among the pieces of information of Table 1 above.

Referring to FIG. 9, in operation 900, a terminal may receive a packet from a lower layer. In operation 902, the terminal may identify a destination identifier of the packet. In operation 904, the terminal may determine whether an SDAP entity is already established for the destination identifier exists. When it is determined that there is no SDAP entity already established for the destination identifier according to the determination of operation 904, the terminal may perform operation 906. In operation 906, the terminal may establish a receiving SDAP entity corresponding to the destination identifier. In operation 908, the terminal may process the packet received in operation 900 through the receiving SDAP entity and transmit the same to a higher layer.

Alternatively, when it is determined that there is the SDAP entity already established for the destination identifier according to the determination of operation 904, the terminal may perform operation 908. In operation 908, the terminal may process the packet received in operation 900 through the receiving SDAP entity and transmit the same to the higher layer. Meanwhile, a criterion for establishing the SDAP entity in operation 904 may be applied according to the pieces of information of Table 1 above.

According to an embodiment, when a PC5 SDAP entity is established for a PC5 flow ID (for example, in case of at least one of (2), (4), or (5) of Table 1), a method by which a reception terminal establishes the PC5 SDAP entity for the PC5 flow ID regarding PC5 unicast, PC5 groupcast, or PC5 broadcast is as a following embodiment.

According to an embodiment, a transmission terminal may configure an SDAP data PDU including PC5 flow ID information. For example, the PC5 flow ID information may be included in a header of the SDAP data PDU. According to an embodiment, the reception terminal may establish the SDAP entity for the PC5 flow ID when the SDAP data PDU including the PC5 flow ID information is received. According to an embodiment, when the SDAP entity is managed via a combination of the PC5 flow ID and a destination identifier or source identifier, the reception terminal may obtain destination identifier or source identifier information from a header of an MAC PDU containing the SDAP data PDU. The above method may be applied to at least one of the PC5 unicast, the PC5 groupcast, or the PC5 broadcast.

According to another embodiment, the transmission terminal may transmit the PC5 flow ID information via PC5 RRC signaling with the reception terminal. The transmission terminal and the reception terminal may establish transmission or reception SDAP entities respectively for the PC5 flow ID, according to the PC5 RRC signaling. When the SDAP entity is managed via the combination of the PC5 flow ID and the destination identifier or source identifier, the PC5 flow ID information may be transmitted together with the corresponding destination identifier or source identifier. At this time, the transmission or receiving SDAP entity may be established for the PC5 flow ID, the destination identifier, or the source identifier. The above method may be applied to the PC5 unicast.

According to an embodiment of the disclosure, when the transmitting SDAP entity and the receiving SDAP entity are established for the destination identifier and the source identifier, the reception terminal may obtain the destination identifier and source identifier information from the header of the MAC PDU containing the SDAP data PDU, and establish the receiving SDAP entity for the destination identifier and the source identifier. According to another embodiment, regarding the PC5 unicast, the reception terminal may establish the receiving SDAP entity, based on the destination identifier and source identifier information obtained via PC5 RRC signaling or PC5-S signaling with the transmission terminal.

According to an embodiment, the established SDAP entity is located at an SDAP sublayer, and one terminal may include one or more SDAP entities defined by at least one of (1) to (7) of Table 1.

According to an embodiment, when the PC5 SDAP function is activated, the SDAP entity of the transmission terminal may perform functions of receiving an SDAP SDU from a higher layer, configuring an SDAP PDU, and transmitting the same to the SDAP entity of the reception terminal via the lower layer. The SDAP entity of the reception terminal may perform functions of receiving the SDAP PDU of the SDAP entity of the transmission terminal via the lower layer, and transmitting the SDAP SDU to the higher layer.

According to an embodiment, when the PC5 SDAP function is activated, the transmitting SDAP entity may perform a function of mapping one or more PC5 QoS flows to a configured SLRB. According to an embodiment, the SLRB may be configured based on information obtained from a base station or pre-configured information, and may be configured according to at least one of a QoS profile corresponding to a QoS flow, PQI, VQI, 5QI, a communication range, or a data rate.

According to an embodiment, operations by which the transmitting SDAP entity processes the packet and transmits the same are as follows. For example, the operations by which the transmitting SDAP entity processes the packet and transmits the same may be applied as Table 2 below, regarding a case in which SLRB configuration for the QoS flow is obtained via the information received from the base station or the pre-configured information, and a case in which the SLRB configuration for the QoS flow is not obtained via the base station or the pre-configured information.

TABLE 2

At the reception of an SDAP SDU from upper layer for a QoS flow, the transmitting SDAP entity shall:

TABLE 2-continued

- if there is no stored QoS flow to SLRB mapping rule for the QoS flow:
  > map the SDAP SDU to the default SLRB:
- else:
  > map the SDAP SDU to the SLRB according to the stored QoS flow to SLRB mapping rule:
- construct the SDAP data PDU:
- submit the constructed SDAP data PDU to the lower layers.

According to an embodiment, operations by which the receiving SDAP entity receives the packet and processes the same are as Table 3 below.

TABLE 3

At the reception of an SDAP data PDU from lower layers for a QoS flow, the receiving SDAP
entity shall:
- retrieve the SDAP SDU from the SDAP data PDU
- deliver the retrieved SDAP SDU to the upper layer.

Figure 11:
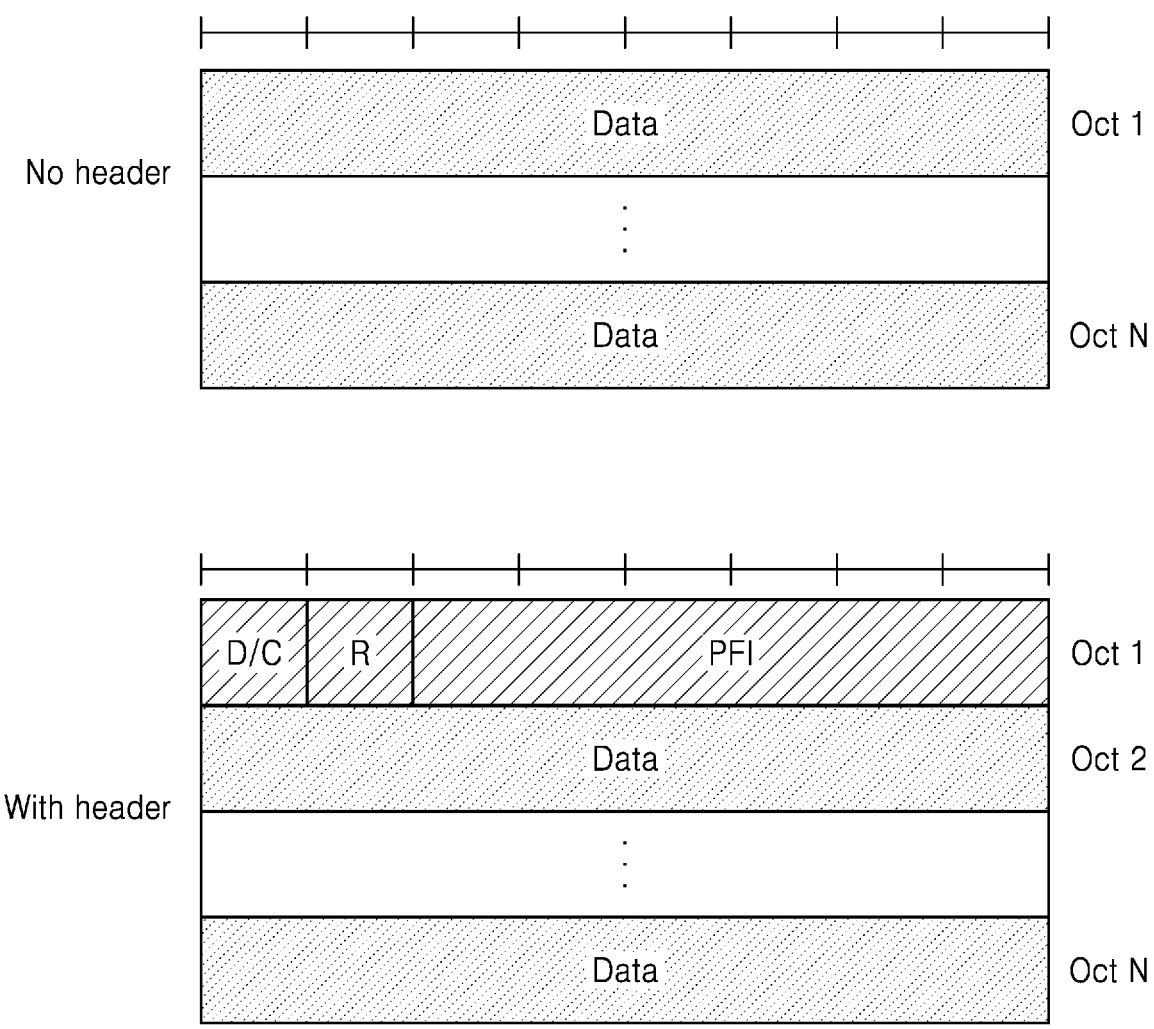
FIG. 11 illustrates a format of an SDAP PDU of an SDAP layer, according to an embodiment of the disclosure.

FIG. 11 illustrates a format of an SDAP PDU of an SDAP layer, according to an embodiment of the disclosure. According to an embodiment, the SDAP PDU may include data of an SDAP SDU.

Figure 10A:
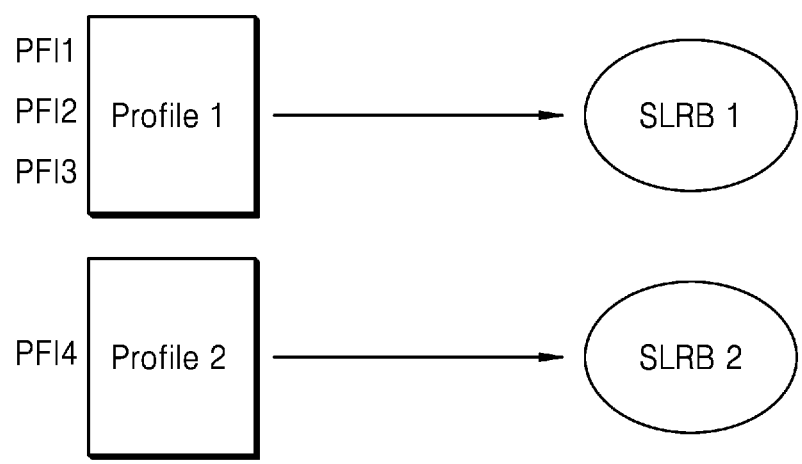
FIG. 10A illustrates an example before mapping of a PC5 flow and a radio bearer is changed, according to an embodiment of the disclosure.
Figure 10B:
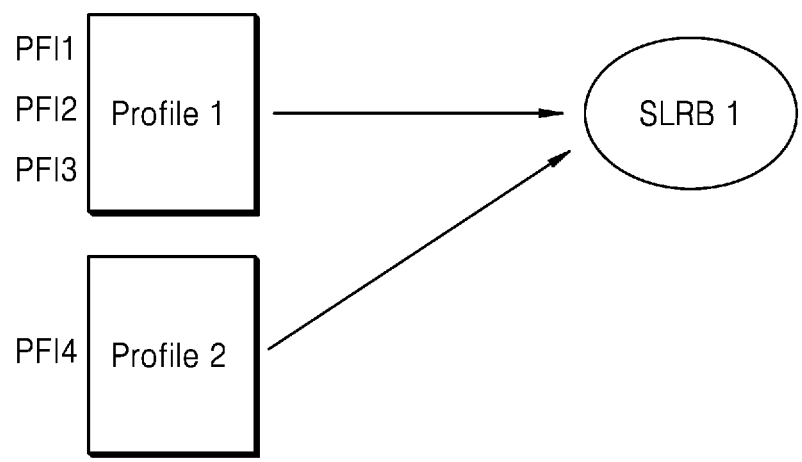
FIG. 10B illustrates an example after mapping of a PC5 flow and a radio bearer is changed, according to an embodiment of the disclosure.

FIGS. 10A and 10B illustrate scenarios in which mapping of a PC5 flow and a radio bearer is changed, according to an embodiment of the disclosure. FIG. 10A illustrates an example before the mapping of the PC5 flow and the radio bearer is changed, and FIG. 10B illustrates an example after the mapping of the PC5 flow and the radio bearer is changed.

Referring to FIG. 10A, a ProSe flow identifier or PC5 flow identifier (PFI)1, a PFI2, and a PFI3 managed by a terminal may correspond to a PC5 flow ID having a QoS profile (at least one piece of information from among a PQI, a range, and a data rate) corresponding to a profile 1. Also, the PFI1, the PFI2, and the PFI3 may be mapped to an SLRB 1. According to an embodiment, a PFI4 may correspond to a PC5 flow ID having a QoS profile corresponding to a profile 2. Also, the PFI4 may be mapped to an SLRB 2.

Then, as shown in FIG. 10B, the terminal may determine that PC5 flow to SLRB mapping is changed such that the PC5 flow ID having the QoS profile 1 corresponding to the PFI1, PFI2, and PFI3, and the PC5 flow ID having the QoS profile 2 corresponding to the PFI4 are mapped to the SLRB 1, according to a system configuration. According to an embodiment, a PC5 flow ID to SLRB mapping change may be applied with respect to one or more PC5 flow IDs of the terminal.

The scenarios of FIGS. 10A and 10B described above may occur when an RRC state of the terminal is changed (RRC_IDLE to RRC_CONNECTED, RRC_INACTIVE to RRC_CONNECTED, RRC_CONNECTED to RRC_IDLE, or RRC_CONNECTED to RRC_INACTIVE), when the terminal is changed from in-coverage to out-of-coverage, when the terminal is changed from out-of-coverage to in-coverage, or when a configuration is changed as the terminal performs handover from a serving cell to a target cell.

A transmission terminal may obtain, from a system, PC5 flow to SLRB mapping change information as in FIGS. 10A and 10B. According to an embodiment, in PC5 unicast communication, the transmission terminal may notify the PC5 flow to SLRB mapping change information to a reception terminal via PC5 RRC signaling. According to an embodiment, in PC5 groupcast or PC5 broadcast, it may not be necessary for the reception terminal to directly obtain the PC5 flow to SLRB mapping change information.

According to an embodiment of the disclosure, when the PC5 flow to SLRB mapping change has occurred as in FIGS. 10A and 10B, a PC5 SDAP layer may support a function (in-order delivery) in which a packet to which mapping information before change is applied is transmitted to the reception terminal and a higher layer of the reception terminal before a packet to which changed mapping information is applied. According to an embodiment of the disclosure, information about whether SDAP in-order delivery of PC5 communication is supported may be obtained through SDAP configuration information among a PC5 flow to SLRB configuration.

According to an embodiment of the disclosure, an example of SDAP configuration information among PC5 QoS flow to SLRB is as Table 4 below.

TABLE 4

| PC5-SDAP-Config ::= | SEQUENCE { |
|---|---|
| defaultSLRB | BOOLEAN, |
| in-order-develiry | ENUMERATED {support, nosupport}, |
| ... | |
| } | |

According to an embodiment, when an in-order delivery parameter value is configured to "support", a transmission terminal may determine that in-order delivery is required when PC5 flow to SLRB information is changed. According to an embodiment, when the in-order delivery parameter value is configured to "nosupport", the transmission terminal may determine that in-order delivery is not required when the PC5 flow to SLRB information is changed. In Table 4, an example in which the in-order delivery parameter value is represented in an enumerated form is described, but the in-order delivery parameter value may be alternatively represented in a Boolean form. According to another embodiment, the transmission terminal may configure the in-order delivery parameter as optional, and determine that the in-order delivery is not required when it is not determined that the in-order delivery parameter is included in an SDAP configuration. Also, the transmission terminal may determine that the in-order delivery is required when it is determined that the in-order delivery parameter is included in the SDAP configuration.

According to an embodiment, the transmission terminal may obtain configuration information including information about whether SDAP in-order delivery is supported, through information transmitted by a base station or pre-configured information. According to an embodiment, in a PC5 unicast, the configuration information about whether the SDAP in-order delivery is supported may be transmitted between the transmission terminal and a reception terminal via a PC5 RRC signal.

According to an embodiment of supporting the in-order delivery, when a PC5 flow to SLRB mapping change occurs, the transmission terminal may transmit, to the reception terminal, a packet to which mapping information before change is applied, and transmit, to the reception terminal, a packet to which changed mapping information is applied, after a certain period of time. According to an embodiment, the certain period of time may be configured in the transmission terminal, in consideration of a transmission time of transmitting a packet to the reception terminal, a packet processing time of processing a packet in the reception terminal, and the like. According to an embodiment, the certain period of time may be configured in the transmission terminal, in consideration of at least one of hybrid automatic repeat request (HARQ) feedback regarding a packet, HARQ retransmission, ARQ feedback, or ARQ retransmission.

According to another embodiment of supporting the in-order delivery, a PC5 SDAP layer may perform an end-marker indicator configuration function. After transmitting the packet to which the mapping information before change is applied, the transmission terminal may transmit end-marker indicator information to the reception terminal, and transmit the packet to which the changed mapping information is applied to the reception terminal afterwards. Then, upon receiving the end-marker indicator information, the reception terminal may transmit a packet received after the end-marker indicator information to a higher layer after first transmitting a packet received before the end-marker indicator information to the higher layer. The reception terminal may determine that a received packet corresponding to a PC5 flow included in the end-marker indicator information is the packet to which the changed mapping information is applied, and first transmit the same to the higher layer.

Figure 12:
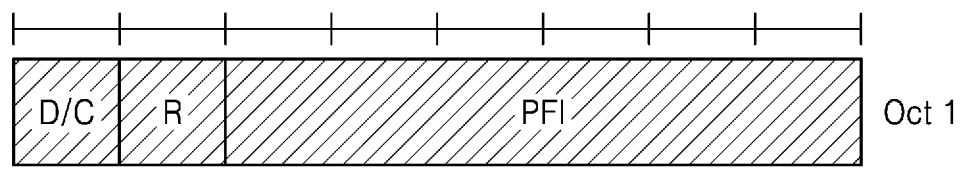
FIG. 12 illustrates a format of an end-marker indicator, according to an embodiment of the disclosure.

FIG. 12 illustrates a format of an end-marker indicator, according to an embodiment of the disclosure.

Also, according to an embodiment, the end-marker indicator may indicate flow ID information before the PC5 flow to SLRB mapping information is changed.

According to an embodiment of the disclosure, whether the end-marker indicator is used may be determined based on whether the PC5 SDAP in-order delivery is supported, as in Table 4 above. In other words, when the PC5 SDAP in-order delivery support is configured, a terminal may determine that the use of the end-marker indicator is configured. In this case, the terminal performing the PC5 SDAP in-order delivery may determine to transmit the end-marker indicator. When the PC5 SDAP in-order delivery support is not configured, the terminal may determine that the use of the end-marker indicator is not configured. In this case, the terminal may determine that the PC5 SDAP in-order delivery is not required to be performed, and that the end-marker indicator is not required to be transmitted.

According to another embodiment of the disclosure, the use of the end-marker indicator may be configured separately in an SDAP configuration among the PC5 SLRB configuration.

According to an embodiment of the disclosure, another example of the SDAP configuration information among the PC5 QoS flow to SLRB is as Table 5 below.

TABLE 5

| PC5-SDAP-Config ::= | SEQUENCE { |
| defaultSLRB | BOOLEAN, |
| in-order-develiry | ENUMERATED {support, nosupport}, |
| end-marker-present | ENUMERATED {present, absent}, |
| ... | |
| } | |

According to an embodiment, when an end-marker-present parameter is configured to "present" and the in-order delivery is performed, the transmission terminal may transmit the end-marker indicator after transmitting a last packet to which prior mapping information is applied. When the end-marker-present parameter is configured to "absent", the transmission terminal may determine that the end-marker indicator is not required to be transmitted, regardless of performing of the in-order delivery. Even when the in-order delivery parameter is configured to "support", the end-marker-present parameter may be configured to "absent". In this case, the transmission terminal may need to support the in-order delivery by using another method instead of transmitting the end-marker indicator. For example, the transmission terminal proposed in the disclosure may perform a method of supporting the reception terminal to first transmit a packet to which prior mapping is applied to the higher layer, during a certain period of time. In the disclosure, an example in which the end-marker-present parameter is represented in an enumerated form is described, but the end-marker-present parameter may alternatively be represented in a Boolean form. According to another embodiment, the transmission terminal may configure the end-marker-present parameter as an optional parameter, and thus determine not to use the end-marker indicator when the end-marker-present parameter is omitted.

The SDAP configuration information including information about whether to use the end-marker indicator may include at least one of information obtained from the base station or pre-configured information. In the PC5 unicast, the configuration information about whether to use the end-marker indicator may be transmitted via a PC5 RRC signal between the transmission terminal and the reception terminal.

When the separate end-marker indicator proposed in the disclosure is not used, operations of an SDAP entity during PC5 QoS flow to SLRB configuration and release may be as follows.

According to an embodiment, when PC5 RRC of the terminal configures QoS flow to SLRB mapping regarding the PC5 flow, a transmitting SDAP entity may perform following operations.

According to an embodiment, the SDAP entity may store SLRB configuration information regarding a QoS flow configured through PC5 RRC, for at least one of a case where an SDAP entity is established and a default SLRB is configured for the QoS flow, or a case where SLRB information different from SLRB information pre-configured for the QoS flow is configured.

According to an embodiment, when the PC5 RRC of the terminal releases the QoS flow to SLRB mapping regarding the PC5 flow, the transmitting SDAP entity may delete the SLRB configuration information stored regarding the PC5 flow.

When the separate end-marker indicator proposed in the disclosure is used, operations of the SDAP entity during the PC5 QoS flow to SLRB configuration and release may be as follows.

According to an embodiment, when the PC5 RRC of the terminal configures the QoS flow to SLRB mapping regarding the PC5 flow, the transmitting SDAP entity may perform following operations.

According to an embodiment, when the SDAP entity is established and the default SLRB is configured for the QoS flow, the SDAP entity may generate the end-marker indicator for the QoS flow, map the generated indicator to the default SLRB, and transmit the same to a lower layer.

According to an embodiment, when the SLRB information different from the SLRB information pre-configured for the QoS flow is configured, the SDAP entity may generate the end-marker indicator for the QoS flow, map the generated indicator to the pre-configured SLRB, and transmit the same to the lower layer.

The SDAP entity may store the SLRB configuration information for the QoS flow configured through the PC5 RRC, for the above two cases.

According to an embodiment, when the PC5 RRC of the terminal releases the QoS flow to SLRB mapping regarding the PC5 flow, the transmitting SDAP entity may delete the SLRB configuration information stored regarding the PC5 flow.

According to various embodiments of the disclosure, operations by which a terminal capable of performing sidelink-based data transmission/reception performs at least one of SDAP function activation, SDAP TX entity establishment, or SDAP RX entity establishment are as follows.

When the terminal determines that an SDAP configuration including SDAP configuration information is obtained, the terminal may determine that an SDAP function may be activated and/or the SDAP TX entity may be established. The SDAP configuration may be obtained as the terminal receives an SIB or dedicated RRC signaling from a base station, or may be determined by the terminal, based on information pre-configured in the terminal, according to the various embodiments described above. When the terminal determines that the SDAP configuration including SDAP configuration information is not obtained, the terminal may determine that the SDAP function may be deactivated and/or the SDAP TX entity may not be established. The terminal may perform a function of a transmission terminal in sidelink unicast-based, sidelink groupcast-based, or sidelink broadcast-based communication.

According to an embodiment, upon determining that the SDAP function may be activated and/or the SDAP TX entity may be established, the terminal may, when connected to an opponent terminal for performing the sidelink unicast-based communication, transmit an SL configuration including the SDAP configuration information to the opponent terminal through various sidelink signals, such as PC5 RRC.

According to an embodiment, upon determining that the SDAP function may be deactivated and/or the SDAP TX entity may not be established, the terminal may, when connected to the opponent terminal for performing the sidelink unicast-based communication, transmit an SL configuration including SDAP non-configuration information to the opponent terminal through various sidelink signals, such as PC5 RRC.

According to an embodiment, upon determining that the SDAP function may be deactivated and/or the SDAP TX entity may not be established, the terminal may, when connected to the opponent terminal for performing the sidelink unicast-based communication, transmit an SL configuration not including the SDAP configuration information to the opponent terminal through various sidelink signals, such as PC5 RRC.

The opponent terminal for performing the sidelink unicast-based communication may, when reception of the SL configuration including the SDAP non-configuration information is determined, determine to deactivate the SDAP function and/or not establish the SDAP RX entity.

According to another embodiment, the opponent terminal for performing the sidelink unicast-based communication may, when reception of the SL configuration not including the SDAP configuration information is determined, determine to deactivate the SDAP function and/or not establish the SDAP RX entity.

The opponent terminal for performing the sidelink unicast-based communication may, when reception of the SL configuration including the SDAP configuration information is determined, determine to activate the SDAP function and/or establish the SDAP RX entity.

According to another embodiment, when the opponent terminal for performing the sidelink unicast-based communication supports the SDAP function, the opponent terminal may, when the reception of the SL configuration including the SDAP configuration information is determined, transmit acknowledgement signaling (for example, SL configuration complete) to the terminal that has transmitted the SL configuration.

According to an embodiment of the disclosure, the terminal may denote a terminal that has transmitted the SL configuration through sidelink signaling. Also, the opponent terminal may denote a terminal that has received the SL configuration through sidelink signaling.

According to another embodiment, when the opponent terminal for performing the sidelink unicast-based communication does not support the SDAP function, the opponent terminal may, when the reception of the SL configuration including the SDAP configuration information is determined, notify the terminal that has transmitted the SL configuration that the SDAP function is unsupported. SDAP function un-support information may be transmitted by transmitting SL configuration failure signaling to the terminal that has transmitted the SL configuration. The SL configuration failure signaling may be transmitted while including cause information indicating a cause of SL configuration failure between two terminals that are to perform the sidelink unicast-based communication. The terminal that has received the SL configuration failure signaling may determine to deactivate the SDAP function and/or not establish the SDAP TX entity. According to another embodiment, the terminal that has received the SL configuration failure signaling may no longer perform the sidelink unicast-based communication with the opponent terminal.

According to another embodiment, when the opponent terminal for performing the sidelink unicast-based communication does not support the SDAP function, the opponent terminal may, even when the reception of the SL configuration including the SDAP configuration information is determined, not notify the terminal that has transmitted the SL configuration that the SDAP function is unsupported and may determine that to deactivate the SDAP function and not establish the SDAP RX entity. In this case, even when the transmission terminal transmits a packet including an SDAP header and/or an SDAP control PDU, the reception terminal may determine that such signalings are not required to be processed.

The reception terminal of sidelink-based groupcast communication or sidelink-based broadcast communication may, when initial packet reception is determined, determine to configure the SDAP function and/or establish the SDAP RX entity.

According to another embodiment, the reception terminal of the sidelink-based groupcast communication or the sidelink-based broadcast communication may determine to arbitrarily configure the SDAP function and/or establish the SDAP RX entity.

According to another embodiment, the reception terminal of the sidelink-based groupcast communication or the sidelink-based broadcast communication may determine to not configure the SDAP function and/or not establish the SDAP RX entity. In this case, even when the transmission terminal transmits the packet including the SDAP header and/or the SDAP control PDU, the reception terminal may determine that such signalings are not required to be processed.

According to another embodiment, a sidelink capability signaling exchange procedure including sidelink SDAP function support information between the two terminals that are to perform the sidelink unicast-based communication may be performed, and when the two terminals both support the sidelink SDAP function, SL configuration signaling including the SDAP configuration information between the two terminals may be exchanged. When it is determined that at least one terminal does not support the sidelink SDAP function, SL configuration signaling not including the SDAP configuration information between the two terminals may be exchanged. When the SL configuration signaling including the SDAP configuration information between the two terminals is exchanged, the two terminals may determine to activate the SDAP function and/or establish the SDAP entity (TX or RX). Information included in the SL configuration signaling including the SDAP configuration information between the two terminals may be configured based on the sidelink SDAP configuration information obtained through RRC dedicated signaling or an SIB transmitted by a base station, or sidelink SDAP configuration information pre-obtained by the terminal.

According to various embodiments of the disclosure, an operation method of a terminal in a wireless communication system may include: determining a type of a core network (a 5G core network or an evolved core network) to which the terminal performing D2D communication is connected; determining whether to activate an SDAP layer function according to the core network; and determining establishment information regarding an SDAP layer entity when the SDAP layer function is activated. Another operation method of the terminal may include: determining configuration information regarding an in-order delivery function of an SDAP layer; and processing information indicating the in-order delivery function of the SDAP layer according to an in-order delivery function configuration of the SDAP layer.

According to various embodiments of the disclosure, a terminal in a wireless communication system includes a transceiver and at least one processor connected to the transceiver. The at least one processor may determine whether to activate an SDAP layer function regarding a sidelink, determine establishment information regarding an SDAP layer entity, and configure the SDAP layer entity. The at least one processor may determine an in-order delivery function configuration of the sidelink SDAP layer, and process indication information regarding an in-order delivery function.

According to various embodiments of the disclosure, an operation method of a base station in a wireless communication system may include: determining an in-order delivery function of an SDAP layer regarding a PC5 unicast link, a PC5 groupcast link, or a PC5 broadcast link for sidelink communication of a terminal; and transmitting in-order delivery function configuration information to the terminal. Another operation method of the base station may include transmitting, to the terminal, sidelink SDAP layer function configuration information of the terminal.

According to various embodiments of the disclosure, an operation method of a terminal in a wireless communication system may include: obtaining SDAP function configuration information regarding a PC5 link for sidelink communication of the terminal; transmitting the SDAP function configuration information regarding the PC5 link to an opponent terminal; determining whether to activate an SDAP function regarding the PC5 link; performing the sidelink communication through the PC5 link according to the activated SDAP function; determining an in-order delivery function configuration of an SDAP layer; and performing in-order delivery in the SDAP layer when an in-order delivery function of the SDAP layer is configured.

According to various embodiments of the disclosure, an operation method of a base station in a wireless communication system may include: generating in-order delivery function configuration information of an SDAP layer regarding a PC5 link for sidelink communication of a terminal, and transmitting the same to the terminal; and generating SDAP layer function configuration information regarding the PC5 link and transmitting the same to the terminal.

The disclosure relates to a communication technique and system in which a 5G communication system for supporting a higher data rate than a beyond 4G communication system is converted to an IoT technology. The disclosure may be applied to intelligent services (e.g., smart homes, smart buildings, smart cities, smart cars or connected cars, health care, digital education, retail business, and security and safety related services) based on 5G communication technology and IoT related technology. The disclosure relates to a method and apparatus for processing operations of a sidelink SDAP layer in a V2X system. According to various embodiments of the disclosure, in a wireless communication system, a terminal includes at least one transceiver and at least one processor coupled to the at least one transceiver, wherein the at least one processor may be configured to: obtain SDAP function activation information for sidelink communication of the terminal; obtain SDAP function configuration information; establish an SDAP entity; determine in-order delivery according to an SDAP configuration; and process a packet.

According to an embodiment of the disclosure, an operation method of a first terminal in a wireless communication system, includes: determining to establish or release a SDAP entity related to sidelink communication, based on SDAP configuration information related to the sidelink communication, wherein the SDAP entity is configured for each of a destination identifier and a cast type; and establishing or releasing the SDAP entity, based on a result of the determining.

In an embodiment, the SDAP configuration information may be received, from a base station belonging to a 5G core network, via an RRC message or system information related to the sidelink communication, or may be pre-configured in the first terminal.

In an embodiment, the determining to establish or release the SDAP entity may include, when an SDAP entity related to the destination identifier and the cast type is not present, based on information included in the SDAP configuration information, establishing the SDAP entity related to the sidelink communication for at least one of groupcast, broadcast, or unicast.

In an embodiment, the determining to establish or release the SDAP entity may include releasing the SDAP entity related to the sidelink communication for at least one of groupcast, broadcast, or unicast, based on information included in the SDAP configuration information.

In an embodiment, the operation method may further include: receiving, from the base station via the RRC message, sidelink DRB mapping information regarding a PC5 QoS flow changed from sidelink DRB mapping information regarding the PC5 QoS flow, which is stored in the first terminal; and transmitting, to a second terminal, the changed sidelink DRB mapping information regarding the PC5 QoS flow.

In an embodiment, the operation method may further include: configuring an end marker related to the changed sidelink DRB mapping information regarding the PC5 QoS flow; and transmitting the configured end marker to the second terminal.

According to an embodiment of the disclosure, an operation method of a second terminal in a wireless communication system, includes: determining to establish or release an SDAP entity related to sidelink communication, based on SDAP configuration information related to the sidelink communication, wherein the SDAP entity is configured for each of a destination identifier and a cast type; and establishing or releasing the SDAP entity, based on a result of the determining.

In an embodiment, the SDAP configuration information may be transmitted from a first terminal via a PC5 RRC message or may be pre-configured in the second terminal.

In an embodiment, the determining to establish or release the SDAP entity may include, when an SDAP entity related to the destination identifier and the cast type is not present, based on information included in the SDAP configuration information, establishing the SDAP entity related to the sidelink communication for at least one of groupcast, broadcast, or unicast.

In an embodiment, the determining to establish or release the SDAP entity may include releasing the SDAP entity related to the sidelink communication for at least one of groupcast, broadcast, or unicast, based on information included in the SDAP configuration information.

In an embodiment, the operation method may further include receiving, from the first terminal, changed sidelink DRB mapping information regarding a PC5 QoS flow.

In an embodiment, the operation method may further include receiving, from the first terminal an end marker related to the changed sidelink DRB mapping information regarding the PC5 QoS flow.

According to an embodiment of the disclosure, a first terminal in a wireless communication system, includes: a transceiver; and at least one processor configured to: determine to establish or release a service data adaptation protocol (SDAP) entity related to sidelink communication, based on SDAP configuration information related to the sidelink communication, wherein the SDAP entity is configured for each of a destination identifier and a cast type; and establish or release the SDAP entity, based on a result of the determination.

According to an embodiment of the disclosure, a second terminal in a wireless communication system, includes: a transceiver; and at least one processor configured to: determine to establish or release a service data adaptation protocol (SDAP) entity related to sidelink communication, based on SDAP configuration information related to the sidelink communication, wherein the SDAP entity is configured for each of a destination identifier and a cast type; and establish or release the SDAP entity, based on a result of the determination.

The methods according to the embodiments of the disclosure described in the claims or the detailed description of the disclosure may be implemented in hardware, software, or a combination of hardware and software.

When the methods are implemented in software, a computer-readable recording medium or computer program product having one or more programs (software modules) recorded thereon may be provided. The one or more programs recorded on the computer-readable recording medium or computer program product are configured to be executable by one or more processors in an electronic device. The one or more programs include instructions to execute the methods according to the embodiments of the disclosure described in the claims or the detailed description of the disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory including a combination of some or all of the above-mentioned memories. In addition, there may be a plurality of memories.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the disclosure. Another storage device on the communication network may also be connected to the apparatus performing the embodiments of the disclosure.

In the disclosure, the term "computer program product" or "computer-readable medium" is used to entirely refer to a medium such as a memory, a hard disk installed in a hard disk drive, or a signal. The "computer program product" or "computer-readable medium" is used to provide a method of performing D2D communication in a wireless communication system, according to the disclosure.

In the afore-described embodiments of the disclosure, elements included in the disclosure are expressed in a singular or plural form according to specific embodiments. However, the singular or plural form is appropriately selected for convenience of explanation and the disclosure is not limited thereto. As such, an element expressed in a plural form may also be configured as a single element, and an element expressed in a singular form may also be configured as plural elements.

Meanwhile, specific embodiments have been described in the detailed description of the disclosure, but various modifications may be possible without departing from the scope of the disclosure. Therefore, the scope of the disclosure should not be limited to the embodiments described above, but should be determined not only by the scope of the following claims, but also by the equivalents of the claims.

The invention claimed is:

1. An operation method of a sidelink transmission terminal in a wireless communication system, the operation method comprising:
   determining a type of a core network (CN);
   determining whether to activate a service data adaptation protocol (SDAP) layer function based on the type of the CN, based on a result of the determination, transmitting a message indicating whether to activate a SDAP layer function to a sidelink reception terminal;
determining to establish or release a service data adaptation protocol (SDAP) entity related to sidelink communication based on SDAP configuration information, wherein the SDAP configuration information includes a cast type associated with a destination identifier, and the destination identifier relates to a destination of the sidelink communication; and
establishing or releasing the SDAP entity, based on the determination to establish or release the SDAP entity,
wherein the cast type associated with the destination identifier is one of unicast, groupcast, or broadcast.

2. The operation method of claim 1, wherein the SDAP configuration information is received, from a base station, via a radio resource control (RRC) message related to the sidelink communication, or pre-configured in the sidelink transmission terminal.

3. The operation method of claim 1, wherein the determining to establish or release the SDAP entity further comprises:
in case that an SDAP entity related to the destination identifier and the cast type is not present, determining to establish the SDAP entity related to the destination identifier and the cast type for the sidelink communication, based on the SDAP configuration information.

4. The operation method of claim 2, further comprising:
receiving, from the base station via the RRC message, sidelink data radio bearer (DRB) mapping information regarding a PC5 quality of service (QoS) flow changed from sidelink DRB mapping information regarding the PC5 QoS flow, which is stored in the sidelink transmission terminal; and
transmitting, to the sidelink reception terminal, the changed sidelink DRB mapping information regarding the PC5 QoS flow.

5. The operation method of claim 4, further comprising:
configuring an end marker related to the changed sidelink DRB mapping information regarding the PC5 QoS flow; and
transmitting the configured end marker to the sidelink reception terminal.

6. The operation method of claim 1, wherein the determining to establish or release the SDAP entity further comprises:
in case that an SDAP entity related to the destination identifier and the cast type is not present, determining to establish the SDAP entity related to the destination identifier and the cast type for the sidelink communication, based on information included in the SDAP configuration information.

7. A sidelink transmission terminal in a wireless communication system, the sidelink transmission terminal comprising:
a transceiver; and
at least one processor configured to:
determine a type of a core network (CN),
determine whether to activate a service data adaptation protocol (SDAP) layer function based on the type of the CN,
based on a result of the determination, transmit a message indicating whether to activate a SDAP layer function to a sidelink reception terminal,
determine to establish or release a service data adaptation protocol (SDAP) entity related to sidelink communication, based on SDAP configuration information, wherein the SDAP configuration information includes a cast type associated with a destination identifier, and the destination identifier relates to a destination of the sidelink communication, and
establish or release the SDAP entity, based on the determination to establish or release the SDAP entity,
wherein the cast type associated with the destination identifier is one of unicast, groupcast, or broadcast.

* * * * *